United States Patent
Chen et al.

(10) Patent No.: US 10,140,718 B2
(45) Date of Patent: Nov. 27, 2018

(54) METHODS AND SYSTEMS OF MAINTAINING OBJECT TRACKERS IN VIDEO ANALYTICS

(71) Applicant: QUALCOMM Incorporated, San Diego, CA (US)

(72) Inventors: Ying Chen, San Diego, CA (US); Lei Wang, Clovis, CA (US); Jinglun Gao, Milpitas, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 15/384,802

(22) Filed: Dec. 20, 2016

(65) Prior Publication Data

US 2018/0047171 A1 Feb. 15, 2018

Related U.S. Application Data

(60) Provisional application No. 62/372,518, filed on Aug. 9, 2016.

(51) Int. Cl.
*G06T 7/20* (2017.01)
*G06K 9/00* (2006.01)
(Continued)

(52) U.S. Cl.
CPC ............ *G06T 7/20* (2013.01); *G06K 9/00711* (2013.01); *G06K 9/4671* (2013.01); *G06T 7/13* (2017.01);
(Continued)

(58) Field of Classification Search
CPC .... G06K 9/00711; G06K 9/4671; G06T 7/13; G06T 7/20; G06T 7/246; G06T 7/30;
(Continued)

(56) References Cited

U.S. PATENT DOCUMENTS 7,391,907 B1 6/2008 Venetianer et al.
7,825,954 B2 11/2010 Zhang et al.
(Continued)

OTHER PUBLICATIONS

International Search Report and Written Opinion—PCT/US2017/035482—ISA/EPO—Sep. 21, 2017.
(Continued)

*Primary Examiner* — Katrina Fujita
(74) *Attorney, Agent, or Firm* — Polsinelli LLP

(57) ABSTRACT

Techniques and systems are provided for processing video data. For example, techniques and systems are provided for maintaining blob trackers for one or more video frames. A blob tracker can be associated with a blob generated for a video frame. The blob includes pixels of at least a portion of one or more foreground objects in the video frame. The blob tracker can be determined to be a first type of tracker or a second type of tracker. A first type of tracker has a first bounding box and a second bounding box with an overlapping ratio greater than an alignment threshold for the first type of tracker. A second type of tracker has an irregular size change or an irregular motion change over a threshold duration. The blob tracker can be removed from the plurality of blob trackers maintained for the one or more video frames when the blob tracker is the first type of tracker or the second type of tracker.

30 Claims, 13 Drawing Sheets

(51) Int. Cl.
*G06K 9/46* (2006.01)
*G06T 7/30* (2017.01)
*G06T 7/13* (2017.01)
*G06T 7/60* (2017.01)
*G06T 7/246* (2017.01)

(52) U.S. Cl.
CPC .............. *G06T 7/246* (2017.01); *G06T 7/30* (2017.01); *G06T 7/60* (2013.01); *G06T 2207/30232* (2013.01); *G06T 2207/30241* (2013.01)

(58) Field of Classification Search
CPC ............. G06T 7/60; G06T 2207/30232; G06T 2207/30241
See application file for complete search history.

(56) References Cited

U.S. PATENT DOCUMENTS

| | | |
|---|---|---|
| 8,879,789 B1 | 11/2014 | Figov et al. |
| 9,390,506 B1 | 7/2016 | Asvatha et al. |
| 2006/0268111 A1* | 11/2006 | Zhang .................... G01S 3/7864 348/169 |
| 2007/0127774 A1* | 6/2007 | Zhang ................. G06K 9/00771 382/103 |
| 2008/0181453 A1 | 7/2008 | Xu et al. |
| 2010/0115149 A1 | 5/2010 | Ewer |
| 2012/0128212 A1 | 5/2012 | Almbladh |
| 2015/0310628 A1 | 10/2015 | Burry |
| 2016/0171311 A1* | 6/2016 | Case .................. G06K 9/00771 382/103 |
| 2016/0171852 A1* | 6/2016 | Lin .................. G08B 13/19608 382/103 |
| 2018/0047193 A1* | 2/2018 | Gao ........................ G06T 7/248 |

OTHER PUBLICATIONS

Lei B., et al., "Real-Time Outdoor Video Surveillance With Robust Foreground Extraction and Object Tracking via Multi-State Transition Management", Pattern Recognition Letters, Nov. 1, 2006, vol. 27. No. 15, XP027922601, ISSN: 0167-8655, pp. 1816-1825.

* cited by examiner

1300

ASSOCIATE A BLOB TRACKER WITH A BLOB GENERATED FOR A VIDEO FRAME, WHEREIN THE BLOB INCLUDES PIXELS OF AT LEAST A PORTION OF ONE OR MORE FOREGROUND OBJECTS IN THE VIDEO FRAME
1302

DETERMINE WHETHER THE BLOB TRACKER IS A FIRST TYPE OF TRACKER OR A SECOND TYPE OF TRACKER, WHEREIN THE FIRST TYPE OF TRACKER HAS A FIRST BOUNDING BOX AND A SECOND BOUNDING BOX WITH AN OVERLAPPING RATIO GREATER THAN AN ALIGNMENT THRESHOLD FOR THE FIRST TYPE OF TRACKER, AND WHEREIN THE SECOND TYPE OF TRACKER HAS AN IRREGULAR SIZE CHANGE OR AN IRREGULAR MOTION CHANGE OVER A THRESHOLD DURATION
1304

REMOVE THE BLOB TRACKER FROM THE PLURALITY OF BLOB TRACKERS MAINTAINED FOR THE ONE OR MORE VIDEO FRAMES WHEN THE BLOB TRACKER IS THE FIRST TYPE OF TRACKER OR THE SECOND TYPE OF TRACKER
1306

FIG. 13

METHODS AND SYSTEMS OF MAINTAINING OBJECT TRACKERS IN VIDEO ANALYTICS

CROSS-REFERENCE TO RELATED APPLICATIONS

This application claims the benefit of U.S. Provisional Application No. 62/372,518, filed Aug. 9, 2016, which is hereby incorporated by reference, in its entirety.

FIELD

The present disclosure generally relates to video analytics, and more specifically to techniques and systems for maintaining object trackers in video analytics to remove false positives.

BACKGROUND

Many devices and systems allow a scene to be captured by generating video data of the scene. For example, an Internet protocol camera (IP camera) is a type of digital video camera that can be employed for surveillance or other applications. Unlike analog closed circuit television (CCTV) cameras, an IP camera can send and receive data via a computer network and the Internet. The video data from these devices and systems can be captured and output for processing and/or consumption.

Video analytics, also referred to as Video Content Analysis (VCA), is a generic term used to describe computerized processing and analysis of a video sequence acquired by a camera. Video analytics provides a variety of tasks, including immediate detection of events of interest, analysis of pre-recorded video for the purpose of extracting events in a long period of time, and many other tasks. For instance, using video analytics, a system can automatically analyze the video sequences from one or more cameras to detect one or more events. In some cases, video analytics can send alerts or alarms for certain events of interest. More advanced video analytics is needed to provide efficient and robust video sequence processing.

BRIEF SUMMARY

In some embodiments, techniques and systems are described for maintaining object trackers (or blob trackers) in video analytics to remove false positive blobs. A blob represents at least a portion of one or more objects in a video frame (also referred to as a "picture"). In some examples, using video analytics, blob detection can be performed for one or more video frames to generate or identify blobs for the one or more video frames. Temporal information of the blobs can be used to identify stable objects or blobs so that a tracking layer can be established. After the blob detection process, there may be false positive blobs that remain and those may be output as incorrect objects (due to a tracker associated with the false positive blob being converted to a normal status). For example, incorrect objects that may be output can include, but are not limited to, moving foliage due to wind, an umbrella or other objects that are still but move due to external elements such as wind, glass doors, isolated shadows, or other suitable objects.

The techniques and systems described herein greatly reduce the rate of false positive blobs being output. In some examples, blob trackers can be maintained by keeping some blob trackers for possible conversion to a normal status and removing other blob trackers before converting the blob trackers to a normal status. For example, when a blob tracker has been continuously associated with blobs and a duration has passed, the blob tracker can be promoted or converted to be a normal tracker. A normal tracker (with normal status) and its associated blob are output as an identified tracker-blob pair to the video analytics system. The techniques and systems described herein can remove some blob trackers from a maintained set of blob trackers based on a history of the bounding boxes associated with each blob tracker (e.g., size and location information of the bounding boxes), connections between blob trackers, a history of states of blob trackers, any combination thereof, or other suitable factors. As used herein, the term "state" maybe used interchangeably with the term "status" for a tracker.

According to at least one example, a method of maintaining a plurality of blob trackers for one or more video frames is provided that includes associating a blob tracker with a blob generated for a video frame. The blob includes pixels of at least a portion of one or more foreground objects in the video frame. The method further includes determining whether the blob tracker is a first type of tracker or a second type of tracker. The first type of tracker has a first bounding box and a second bounding box with an overlapping ratio greater than an alignment threshold for the first type of tracker. The first type of tracker can also, in some examples, be referred to as a frozen tracker. The second type of tracker has an irregular size change or an irregular motion change over a threshold duration. The second type of tracker can also, in some examples, be referred to as a jumping tracker. The method further includes removing the blob tracker from the plurality of blob trackers maintained for the one or more video frames when the blob tracker is the first type of tracker or the second type of tracker.

In another example, an apparatus is provided that includes a memory configured to store video data and a processor. The processor is configured to and can associate a blob tracker with a blob generated for a video frame. The blob includes pixels of at least a portion of one or more foreground objects in the video frame. The processor is configured to and can determine whether the blob tracker is a first type of tracker or a second type of tracker. The first type of tracker has a first bounding box and a second bounding box with an overlapping ratio greater than an alignment threshold for the first type of tracker. The second type of tracker has an irregular size change or an irregular motion change over a threshold duration. The processor is configured to and can remove the blob tracker from a plurality of blob trackers maintained for the one or more video frames when the blob tracker is the first type of tracker or the second type of tracker.

In another example, a computer readable medium is provided having stored thereon instructions that when executed by a processor perform a method that includes: associating a blob tracker with a blob generated for a video frame, wherein the blob includes pixels of at least a portion of one or more foreground objects in the video frame; determining whether the blob tracker is a first type of tracker or a second type of tracker, wherein the first type of tracker has a first bounding box and a second bounding box with an overlapping ratio greater than an alignment threshold for the first type of tracker, and wherein the second type of tracker has an irregular size change or an irregular motion change over a threshold duration; and removing the blob tracker from a plurality of blob trackers maintained for the one or more video frames when the blob tracker is the first type of tracker or the second type of tracker.

In another example, an apparatus is provided that includes means for associating a blob tracker with a blob generated for a video frame. The blob includes pixels of at least a portion of one or more foreground objects in the video frame. The apparatus further comprises means for determining whether the blob tracker is a first type of tracker or a second type of tracker. The first type of tracker has a first bounding box and a second bounding box with an overlapping ratio greater than an alignment threshold for the first type of tracker. The second type of tracker has an irregular size change or an irregular motion change over a threshold duration. The apparatus further comprises means for removing the blob tracker from the plurality of blob trackers maintained for the one or more video frames when the blob tracker is the first type of tracker or the second type of tracker.

In some aspects, the overlapping ratio includes a ratio of an intersection and a union of the first bounding box of the blob tracker in a previous video frame and the second bounding box of the blob tracker in the video frame.

In some aspects, wherein determining whether the blob tracker is the first type of tracker comprises: determining an alignment threshold for the blob tracker; determining the overlapping ratio of the first bounding box and the second bounding box of the blob tracker; comparing the overlapping ratio of the blob tracker to the alignment threshold; and determining the blob tracker is the first type of tracker when the overlapping ratio is greater than the alignment threshold. In some aspects, the alignment threshold for the blob tracker is based on a size of the first bounding box or the second bounding box of the blob tracker. In some aspects, the blob tracker is determined to be the first type of tracker when overlapping ratios of the blob tracker are greater than the alignment threshold for a threshold number of frames.

In some aspects, determining whether the blob tracker is the second type of tracker further comprises: determining a number of irregular size changes of the blob tracker within the threshold duration, wherein an irregular size change includes a change in size of the blob tracker between a previous video frame and the video frame greater than a size change threshold; comparing the number of irregular size changes of the blob tracker to a threshold number of irregular size changes; and determining the blob tracker is the second type of tracker when the number of irregular size changes of the blob tracker is greater than the threshold number of irregular size changes.

In some aspects, determining whether the blob tracker is the second type of tracker further comprises: determining an irregular motion change of the blob tracker, the irregular motion change including a motion direction consistency of the blob tracker, wherein the motion direction consistency is based on velocities of the blob tracker between consecutive frames; comparing the motion direction consistency of the blob tracker to a motion direction threshold; and determining the blob tracker is the second type of tracker when the motion direction consistency of the blob tracker is less than the motion direction threshold.

In some aspects, determining whether the blob tracker is the second type of tracker further comprises: determining an irregular motion change of the blob tracker, the irregular motion change including a motion magnitude of the blob tracker, wherein the motion magnitude includes a magnitude of velocities of the blob tracker over the threshold duration; comparing the motion magnitude of the blob tracker to a motion magnitude threshold; and determining the blob tracker is the second type of tracker when the motion magnitude of the blob tracker is greater than the motion magnitude threshold.

In some aspects, the methods, apparatuses, and computer readable medium described above further comprise: associating an additional blob tracker with an additional blob generated for the video frame, wherein the additional blob tracker is split from the blob tracker; and transitioning the additional blob tracker to a new blob tracker in response to removal of the blob tracker from the plurality of blob trackers, wherein the new blob tracker has a longer threshold duration for being output as an identified blob tracker-blob pair with the additional blob than the additional blob tracker.

In some aspects, the methods, apparatuses, and computer readable medium described above further comprise: determining a duration the blob tracker has been associated with one or more blobs; and determining the duration is greater than the threshold duration, wherein the blob tracker is determined to be the first type of tracker or the second type of tracker in response to the duration being greater than the threshold duration.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 13 is a flowchart illustrating an example of a process of maintaining blob trackers, in accordance with some embodiments.

DETAILED DESCRIPTION

Figure 1:
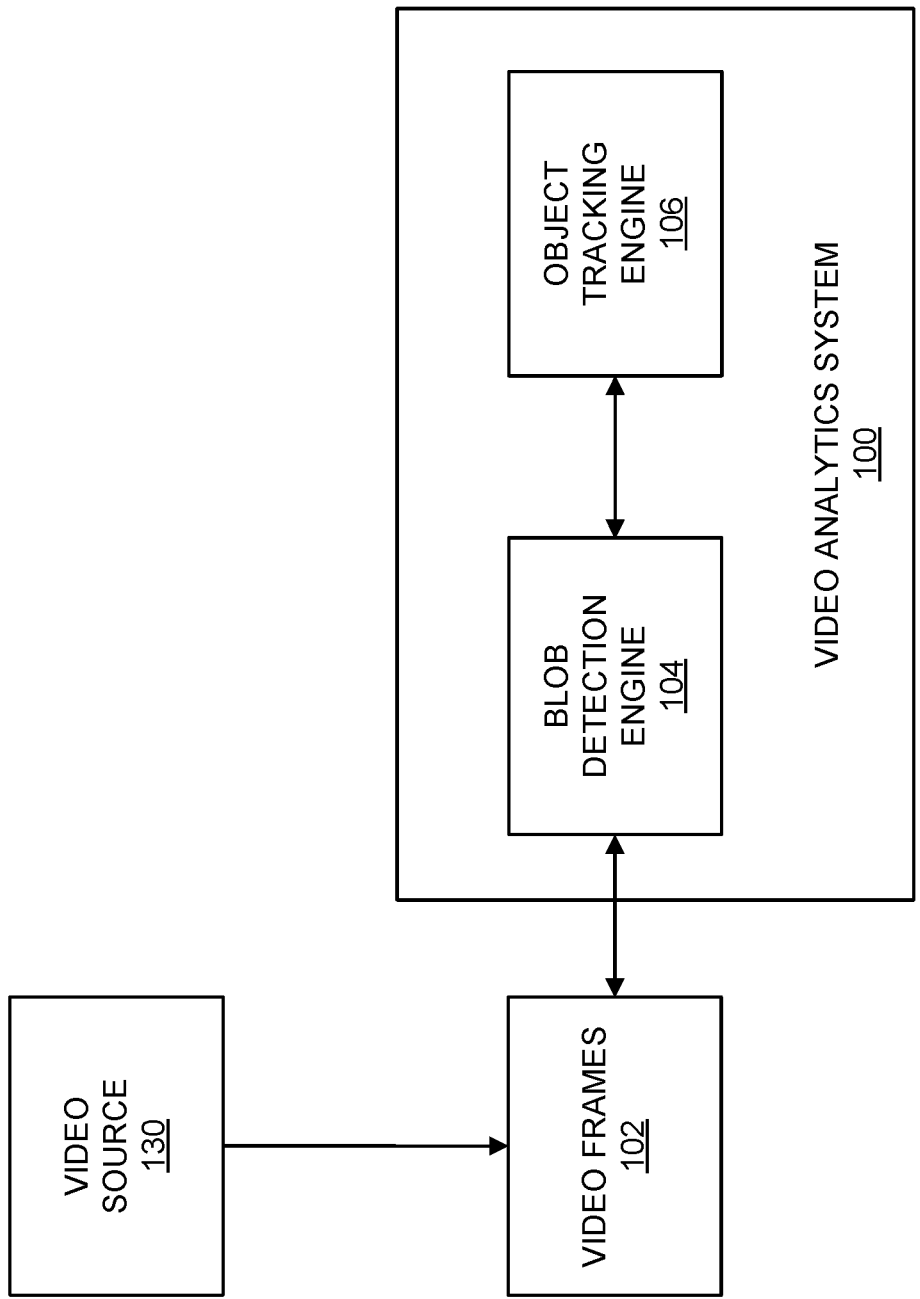
FIG. 1 is a block diagram illustrating an example of a system including a video source and a video analytics system, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

A video analytics system can obtain a video sequence from a video source and can process the video sequence to provide a variety of tasks. One example of a video source can include an Internet protocol camera (IP camera), or other video capture device. An IP camera is a type of digital video camera that can be used for surveillance, home security, or other suitable application. Unlike analog closed circuit television (CCTV) cameras, an IP camera can send and receive data via a computer network and the Internet. In some instances, one or more IP cameras can be located in a scene or an environment, and can remain static while capturing video sequences of the scene or environment.

An IP camera can be used to send and receive data via a computer network and the Internet. In some cases, IP camera systems can be used for two-way communications. For example, data (e.g., audio, video, metadata, or the like) can be transmitted by an IP camera using one or more network cables or using a wireless network, allowing users to communicate with what they are seeing. In one illustrative example, a gas station clerk can assist a customer with how to use a pay pump using video data provided from an IP camera (e.g., by viewing the customer's actions at the pay pump). Commands can also be transmitted for pan, tilt, zoom (PTZ) cameras via a single network or multiple networks. Furthermore, IP camera systems provide flexibility and wireless capabilities. For example, IP cameras provide for easy connection to a network, adjustable camera location, and remote accessibility to the service over Internet. IP camera systems also provide for distributed intelligence. For example, with IP cameras, video analytics can be placed in the camera itself. Encryption and authentication is also easily provided with IP cameras. For instance, IP cameras offer secure data transmission through already defined encryption and authentication methods for IP based applications. Even further, labor cost efficiency is increased with IP cameras. For example, video analytics can produce alarms for certain events, which reduces the labor cost in monitoring all cameras (based on the alarms) in a system.

Video analytics provides a variety of tasks ranging from immediate detection of events of interest, to analysis of pre-recorded video for the purpose of extracting events in a long period of time, as well as many other tasks. Various research studies and real-life experiences indicate that in a surveillance system, for example, a human operator typically cannot remain alert and attentive for more than 20 minutes, even when monitoring the pictures from one camera. When there are two or more cameras to monitor or as time goes beyond a certain period of time (e.g., 20 minutes), the operator's ability to monitor the video and effectively respond to events is significantly compromised. Video analytics can automatically analyze the video sequences from the cameras and send alarms for events of interest. This way, the human operator can monitor one or more scenes in a passive mode. Furthermore, video analytics can analyze a huge volume of recorded video and can extract specific video segments containing an event of interest.

Video analytics also provides various other features. For example, video analytics can operate as an Intelligent Video Motion Detector by detecting moving objects and by tracking moving objects. In some cases, the video analytics can generate and display a bounding box around a valid object. Video analytics can also act as an intrusion detector, a video counter (e.g., by counting people, objects, vehicles, or the like), a camera tamper detector, an object left detector, an object/asset removal detector, an asset protector, a loitering detector, and/or as a slip and fall detector. Video analytics can further be used to perform various types of recognition functions, such as face detection and recognition, license plate recognition, object recognition (e.g., bags, logos, body marks, or the like), or other recognition functions. In some cases, video analytics can be trained to recognize certain objects. Another function that can be performed by video analytics includes providing demographics for customer metrics (e.g., customer counts, gender, age, amount of time spent, and other suitable metrics). Video analytics can also perform video search (e.g., extracting basic activity for a given region) and video summary (e.g., extraction of the key movements). In some instances, event detection can be performed by video analytics, including detection of fire, smoke, fighting, crowd formation, or any other suitable even the video analytics is programmed to or learns to detect. A detector can trigger the detection of an event of interest and sends an alert or alarm to a central control room to alert a user of the event of interest.

As noted previously, a video analytics system can generate and detect foreground blobs that can be used to perform various operations, such as object tracking or other operations described above. A blob tracker can be used to track one or more blobs in a video sequence. A blob tracker can start to be associated with a blob in one frame, and can be connected with blobs across one or more subsequent frames. False positive blobs may be generated during the blob detection process, and may be output as incorrect objects to the video analytics system after the blob tracking process. As described in more detail below, systems and methods are described herein for removing false positive blob trackers from a maintained set of blob trackers based on a history of the bounding boxes associated with the blob trackers, connections between blob trackers, a history of states of the blob trackers, any combination thereof, or other suitable factors.

FIG. 1 is a block diagram illustrating an example of a video analytics system 100. The video analytics system 100 receives video frames 102 from a video source 130. The video frames 102 can also be referred to herein as a video picture or a picture. The video frames 102 can be part of one or more video sequences. The video source 130 can include a video capture device (e.g., a video camera, a camera phone, a video phone, or other suitable capture device), a video storage device, a video archive containing stored video, a video server or content provider providing video data, a video feed interface receiving video from a video server or content provider, a computer graphics system for generating computer graphics video data, a combination of such sources, or other source of video content. In one example, the video source 130 can include an IP camera or multiple IP cameras. In an illustrative example, multiple IP cameras can be located throughout an environment, and can provide the video frames 102 to the video analytics system 100. For instance, the IP cameras can be placed at various fields of view within the environment so that surveillance can be performed based on the captured video frames 102 of the environment.

In some embodiments, the video analytics system 100 and the video source 130 can be part of the same computing device. In some embodiments, the video analytics system 100 and the video source 130 can be part of separate computing devices. In some examples, the computing device (or devices) can include one or more wireless transceivers for wireless communications. The computing device (or devices) can include an electronic device, such as a camera (e.g., an IP camera or other video camera, a camera phone, a video phone, or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, or any other suitable electronic device.

The video analytics system 100 includes a blob detection engine 104 and an object tracking engine 106. Object detection and tracking allows the video analytics system 100 to provide various end-to-end features, such as the video analytics features described above. For example, intelligent motion detection, intrusion detection, and other features can directly use the results from object detection and tracking to generate end-to-end events. Other features, such as people, vehicle, or other object counting and classification can be greatly simplified based on the results of object detection and tracking. The blob detection engine 104 can detect one or more blobs in video frames (e.g., video frames 102) of a video sequence, and the object tracking engine 106 can track the one or more blobs across the frames of the video sequence. As used herein, a blob refers to pixels of at least a portion of an object in a video frame. For example, a blob can include a contiguous group of pixels making up at least a portion of a foreground object in a video frame. In another example, a blob can refer to a contiguous group of pixels making up at least a portion of a background object in a frame of image data. A blob can also be referred to as an object, a portion of an object, a blotch of pixels, a pixel patch, a cluster of pixels, a blot of pixels, a spot of pixels, a mass of pixels, or any other term referring to a group of pixels of an object or portion thereof. In some examples, a bounding box can be associated with a blob. In some examples, a tracker can also be represented by a tracker bounding box. In the tracking layer, in case there is no need to know how the blob is formulated within a bounding box, the term blob and bounding box may be used interchangeably.

As described in more detail below, blobs can be tracked using blob trackers. A blob tracker can be associated with a tracker bounding box and can be assigned a tracker identifier (ID). In some examples, a bounding box for a blob tracker in a current frame can be the bounding box of a previous blob in a previous frame for which the blob tracker was associated. For instance, when the blob tracker is updated in the previous frame (after being associated with the previous blob in the previous frame), updated information for the blob tracker can include the tracking information for the previous frame and also prediction of a location of the blob tracker in the next frame (which is the current frame in this example). The prediction of the location of the blob tracker in the current frame can be based on the location of the blob in the previous frame. A history or motion model can be maintained for a blob tracker, including a history of various states, a history of the velocity, and a history of location, of continuous frames, for the blob tracker, as described in more detail below.

In some examples, a motion model for a blob tracker can determine and maintain two locations of the blob tracker for each frame. For example, a first location for a blob tracker for a current frame can include a predicted location in the current frame. The first location is referred to herein as the predicted location. The predicted location of the blob tracker in the current frame includes a location in a previous frame of a blob with which the blob tracker was associated. Hence, the location of the blob associated with the blob tracker in the previous frame can be used as the predicted location of the blob tracker in the current frame. A second location for the blob tracker for the current frame can include a location in the current frame of a blob with which the tracker is associated in the current frame. The second location is referred to herein as the actual location. Accordingly, the location in the current frame of a blob associated with the blob tracker is used as the actual location of the blob tracker in the current frame. The actual location of the blob tracker in the current frame can be used as the predicted location of the blob tracker in a next frame. The location of the blobs can include the locations of the bounding boxes of the blobs.

The velocity of a blob tracker can include the displacement of a blob tracker between consecutive frames. For example, the displacement can be determined between the centers (or centroids) of two bounding boxes for the blob tracker in two consecutive frames. In one illustrative example, the velocity of a blob tracker can be defined as $V_t = C_t - C_{t-1}$, where $C_t - C_{t-1} = (C_{tx} - C_{t-1x}, C_{ty} - C_{t-1y})$. The term $C_t(C_{tx}, C_{ty})$ denotes the center position of a bounding box of the tracker in a current frame, with $C_{tx}$ being the x-coordinate of the bounding box, and $C_{ty}$ being the y-coordinate of the bounding box. The term $C_{t-1}(C_{t-1x}, C_{t-1y})$ denotes the center position (x and y) of a bounding box of the tracker in a previous frame. In some implementations, it is also possible to use four parameters to estimate x, y, width, height at the same time. In some cases, because the timing for video frame data is constant or at least not dramatically different overtime (according to the frame rate, such as 30 frames per second, 60 frames per second, 120 frames per second, or other suitable frame rate), a time variable may not be needed in the velocity calculation. In some cases, a time constant can be used (according to the instant frame rate) and/or a timestamp can be used.

Using the blob detection engine 104 and the object tracking engine 106, the video analytics system 100 can perform blob generation and detection for each frame or picture of a video sequence. For example, the blob detection engine 104 can perform background subtraction for a frame, and can then detect foreground pixels in the frame. Foreground blobs are generated from the foreground pixels using morphology operations and spatial analysis. Further, blob trackers from previous frames need to be associated with the foreground blobs in a current frame, and also need to be updated. Both the data association of trackers with blobs and tracker updates can rely on a cost function calculation. For example, when blobs are detected from a current input video frame, the blob trackers from the previous frame can be associated with the detected blobs according to a cost calculation. Trackers are then updated according to the data association, including updating the state and location of the trackers so that tracking of objects in the current frame can be fulfilled. Further details related to the blob detection engine 104 and the object tracking engine 106 are described with respect to FIGS. 3-4.

Figure 2:
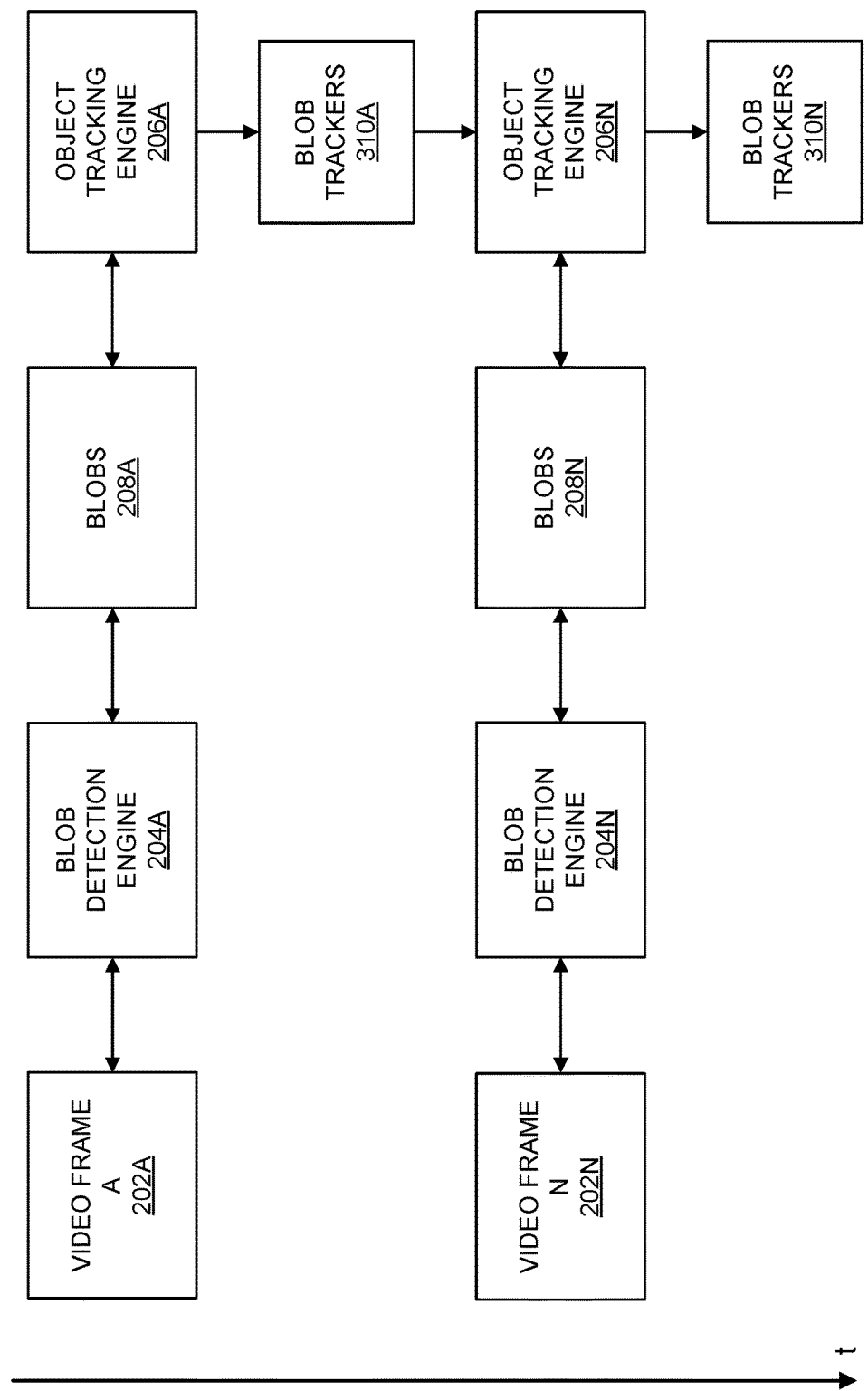
FIG. 2 is an example of a video analytics system processing video frames, in accordance with some embodiments.

FIG. 2 is an example of the video analytics system (e.g., video analytics system 100) processing video frames across time t. As shown in FIG. 2, a video frame A 202A is received by a blob detection engine 204A. The blob detection engine 204A generates foreground blobs 208A for the current frame A 202A. After blob detection is performed, the foreground blobs 208A can be used for temporal tracking by the object tracking engine 206A. Costs (e.g., a cost including a distance, a weighted distance, or other cost) between blob trackers and blobs can be calculated by the object tracking engine 206A. The object tracking engine 206A can perform data association to associate or match the blob trackers (e.g., blob trackers generated or updated based on a previous frame or newly generated blob trackers) and blobs 208A using the calculated costs (e.g., using a cost matrix or other suitable association technique). The blob trackers can be updated, including in terms of positions of the trackers, according to the data association to generate updated blob trackers 310A. For example, a blob tracker's state and location for the video frame A 202A can be calculated and updated. The blob tracker's location in a next video frame N 202N can also be predicted from the current video frame A 202A. For example, the predicted location of a blob tracker for the next video frame N 202N can include the location of the blob tracker (and its associated blob) in the current video frame A 202A. Tracking of blobs of the current frame A 202A can be performed once the updated blob trackers 310A are generated.

When a next video frame N 202N is received, the blob detection engine 204N generates foreground blobs 208N for the frame N 202N. The object tracking engine 206N can then perform temporal tracking of the blobs 208N. For example, the object tracking engine 206N obtains the blob trackers 310A that were updated based on the prior video frame A 202A. The object tracking engine 206N can then calculate a cost and can associate the blob trackers 310A and the blobs 208N using the newly calculated cost. The blob trackers 310A can be updated according to the data association to generate updated blob trackers 310N.

Figure 3:
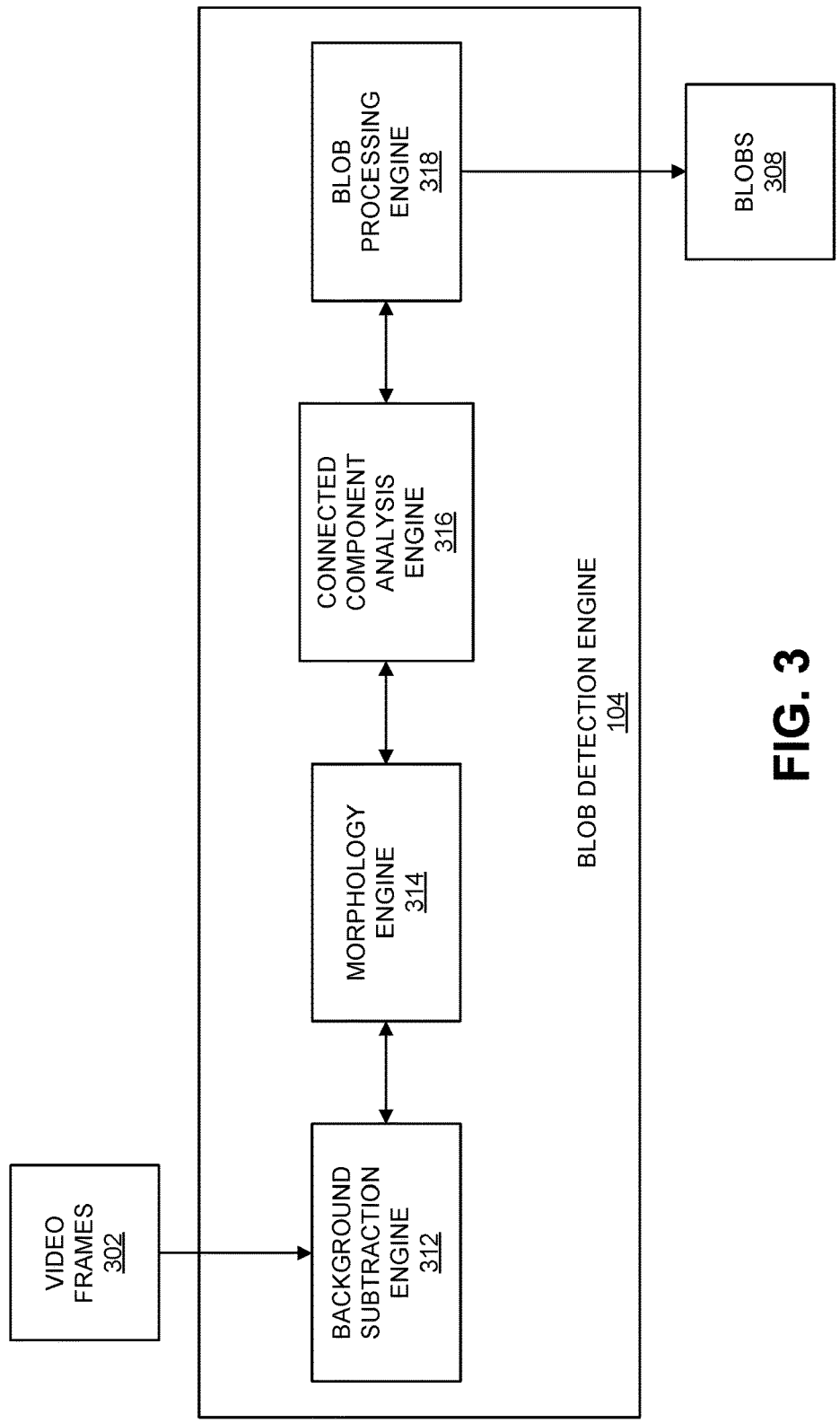
FIG. 3 is a block diagram illustrating an example of a blob detection engine, in accordance with some embodiments.

FIG. 3 is a block diagram illustrating an example of a blob detection engine 104. Blob detection is used to segment moving objects from the global background in a scene. The blob detection engine 104 includes a background subtraction engine 312 that receives video frames 302. The background subtraction engine 312 can perform background subtraction to detect foreground pixels in one or more of the video frames 302. For example, the background subtraction can be used to segment moving objects from the global background in a video sequence and to generate a foreground-background binary mask (referred to herein as a foreground mask). In some examples, the background subtraction can perform a subtraction between a current frame or picture and a background model including the background part of a scene (e.g., the static or mostly static part of the scene). Based on the results of background subtraction, the morphology engine 314 and connected component analysis engine 316 can perform foreground pixel processing to group the foreground pixels into foreground blobs for tracking purpose. For example, after background subtraction, morphology operations can be applied to remove noisy pixels as well as to smooth the foreground mask. Connected component analysis can then be applied to generate the blobs. Blob processing can then be performed, which may include further filtering out some blobs and merging together some blobs to provide bounding boxes as input for tracking.

The background subtraction engine 312 can model the background of a scene (e.g., captured in the video sequence) using any suitable background subtraction technique (also referred to as background extraction). One example of a background subtraction method used by the background subtraction engine 312 includes modeling the background of the scene as a statistical model based on the relatively static pixels in previous frames which are not considered to belong to any moving region. For example, the background subtraction engine 312 can use a Gaussian distribution model for each pixel location, with parameters of mean and variance to model each pixel location in frames of a video sequence. All the values of previous pixels at a particular pixel location are used to calculate the mean and variance of the target Gaussian model for the pixel location. When a pixel at a given location in a new video frame is processed, its value will be evaluated by the current Gaussian distribution of this pixel location. A classification of the pixel to either a foreground pixel or a background pixel is done by comparing the difference between the pixel value and the mean of the designated Gaussian model. In one illustrative example, if the distance of the pixel value and the Gaussian Mean is less than 3 times of the variance, the pixel is classified as a background pixel. Otherwise, in this illustrative example, the pixel is classified as a foreground pixel. At the same time, the Gaussian model for a pixel location will be updated by taking into consideration the current pixel value.

The background subtraction engine 312 can also perform background subtraction using a mixture of Gaussians (also referred to as a Gaussian mixture model (GMM)). A GMM models each pixel as a mixture of Gaussians and uses an online learning algorithm to update the model. Each Gaussian model is represented with mean, standard deviation (or covariance matrix if the pixel has multiple channels), and weight. Weight represents the probability that the Gaussian occurs in the past history.

$$P(X_t) = \sum_{i=1}^{K} \omega_{i,t} N\left(X_t \mid \mu_{i,t}, \sum_{i,t}\right)$$ Equation (1)

An equation of the GMM model is shown in equation (1), wherein there are K Gaussian models. Each Gaussian model has a distribution with a mean of µ and variance of Σ, and has a weight ω. Here, i is the index to the Gaussian model and t is the time instance. As shown by the equation, the parameters of the GMM change over time after one frame (at time t) is processed.

The background subtraction techniques mentioned above are based on the assumption that the camera is mounted still, and if anytime the camera is moved or orientation of the camera is changed, a new background model will need to be calculated. There are also background subtraction methods that can handle foreground subtraction based on a moving background, including techniques such as tracking key points, optical flow, saliency, and other motion estimation based approaches.

The background subtraction engine 312 can generate a foreground mask with foreground pixels based on the result of background subtraction. For example, the foreground mask can include a binary image containing the pixels making up the foreground objects (e.g., moving objects) in a scene and the pixels of the background. In some examples, the background of the foreground mask (background pixels) can be a solid color, such as a solid white background, a solid black background, or other solid color. In such examples, the foreground pixels of the foreground mask can be a different color than that used for the background pixels, such as a solid black color, a solid white color, or other solid color. In one illustrative example, the background pixels can be black (e.g., pixel color value 0 in 8-bit grayscale or other suitable value) and the foreground pixels can be white (e.g., pixel color value 255 in 8-bit grayscale or other suitable value). In another illustrative example, the background pixels can be white and the foreground pixels can be black.

Using the foreground mask generated from background subtraction, a morphology engine 314 can perform morphology functions to filter the foreground pixels. The morphology functions can include erosion and dilation functions. In one example, an erosion function can be applied, followed by a series of one or more dilation functions. An erosion function can be applied to remove pixels on object boundaries. For example, the morphology engine 314 can apply an erosion function (e.g., FilterErode3×3) to a 3×3 filter window of a center pixel, which is currently being processed. The 3×3 window can be applied to each foreground pixel (as the center pixel) in the foreground mask. One of ordinary skill in the art will appreciate that other window sizes can be used other than a 3×3 window. The erosion function can include an erosion operation that sets a current foreground pixel in the foreground mask (acting as the center pixel) to a background pixel if one or more of its neighboring pixels within the 3×3 window are background pixels. Such an erosion operation can be referred to as a strong erosion operation or a single-neighbor erosion operation. Here, the neighboring pixels of the current center pixel include the eight pixels in the 3×3 window, with the ninth pixel being the current center pixel.

A dilation operation can be used to enhance the boundary of a foreground object. For example, the morphology engine 314 can apply a dilation function (e.g., FilterDilate3×3) to a 3×3 filter window of a center pixel. The 3×3 dilation window can be applied to each background pixel (as the center pixel) in the foreground mask. One of ordinary skill in the art will appreciate that other window sizes can be used other than a 3×3 window. The dilation function can include a dilation operation that sets a current background pixel in the foreground mask (acting as the center pixel) as a foreground pixel if one or more of its neighboring pixels in the 3×3 window are foreground pixels. The neighboring pixels of the current center pixel include the eight pixels in the 3×3 window, with the ninth pixel being the current center pixel. In some examples, multiple dilation functions can be applied after an erosion function is applied. In one illustrative example, three function calls of dilation of 3×3 window size can be applied to the foreground mask before it is sent to the connected component analysis engine 316. In some examples, an erosion function can be applied first to remove noise pixels, and a series of dilation functions can then be applied to refine the foreground pixels. In one illustrative example, one erosion function with 3×3 window size is called first, and three function calls of dilation of 3×3 window size are applied to the foreground mask before it is sent to the connected component analysis engine 316. Details regarding content-adaptive morphology operations are described below.

After the morphology operations are performed, the connected component analysis engine 316 can apply connected component analysis to connect neighboring foreground pixels to formulate connected components and blobs. One example of the connected component analysis performed by the connected component analysis engine 316 is implemented as follows:

--- for each pixel of the foreground mask {
  if it is a foreground pixel and has not been processed, the following steps apply:
    Apply FloodFill function to connect this pixel to other foreground and generate a connected component
    Insert the connected component in a list of connected components.
    Mark the pixels in the connected component as being processed }

---

The Floodfill (seed fill) function is an algorithm that determines the area connected to a seed node in a multi-dimensional array (e.g., a 2-D image in this case). This Floodfill function first obtains the color or intensity value at the seed position (e.g., a foreground pixel) of the source foreground mask, and then finds all the neighbor pixels that have the same (or similar) value based on 4 or 8 connectivity. For example, in a 4 connectivity case, a current pixel's neighbors are defined as those with a coordination being (x+d, y) or (x, y+d), wherein d is equal to 1 or −1 and (x, y) is the current pixel. One of ordinary skill in the art will appreciate that other amounts of connectivity can be used. Some objects are separated into different connected components and some objects are grouped into the same connected components (e.g., neighbor pixels with the same or similar values). Additional processing may be applied to further process the connected components for grouping. Finally, the blobs 308 are generated that include neighboring foreground pixels according to the connected components. In one example, a blob can be made up of one connected component. In another example, a blob can include multiple connected components (e.g., when two or more blobs are merged together).

The blob processing engine 318 can perform additional processing to further process the blobs generated by the connected component analysis engine 316. In some examples, the blob processing engine 318 can generate the bounding boxes to represent the detected blobs and blob trackers. In some cases, the blob bounding boxes can be output from the blob detection engine 104. In some examples, the blob processing engine 318 can perform content-based filtering of certain blobs. For instance, a machine learning method can determine that a current blob contains noise (e.g., foliage in a scene). Using the machine learning information, the blob processing engine 318 can determine the current blob is a noisy blob and can remove it from the resulting blobs that are provided to the object tracking engine 106. In some examples, the blob processing engine 318 can merge close blobs into one big blob to remove the risk of having too many small blobs that could belong to one object. In some examples, the blob processing engine 318 can filter out one or more small blobs that are below a certain size threshold (e.g., an area of a bounding box surrounding a blob is below an area threshold). In some embodiments, the blob detection engine 104 does not include the blob processing engine 318, or does not use the blob processing engine 318 in some instances. For example, the blobs generated by the connected component analysis engine 316, without further processing, can be input to the object tracking engine 106 to perform blob and/or object tracking.

Figure 4:
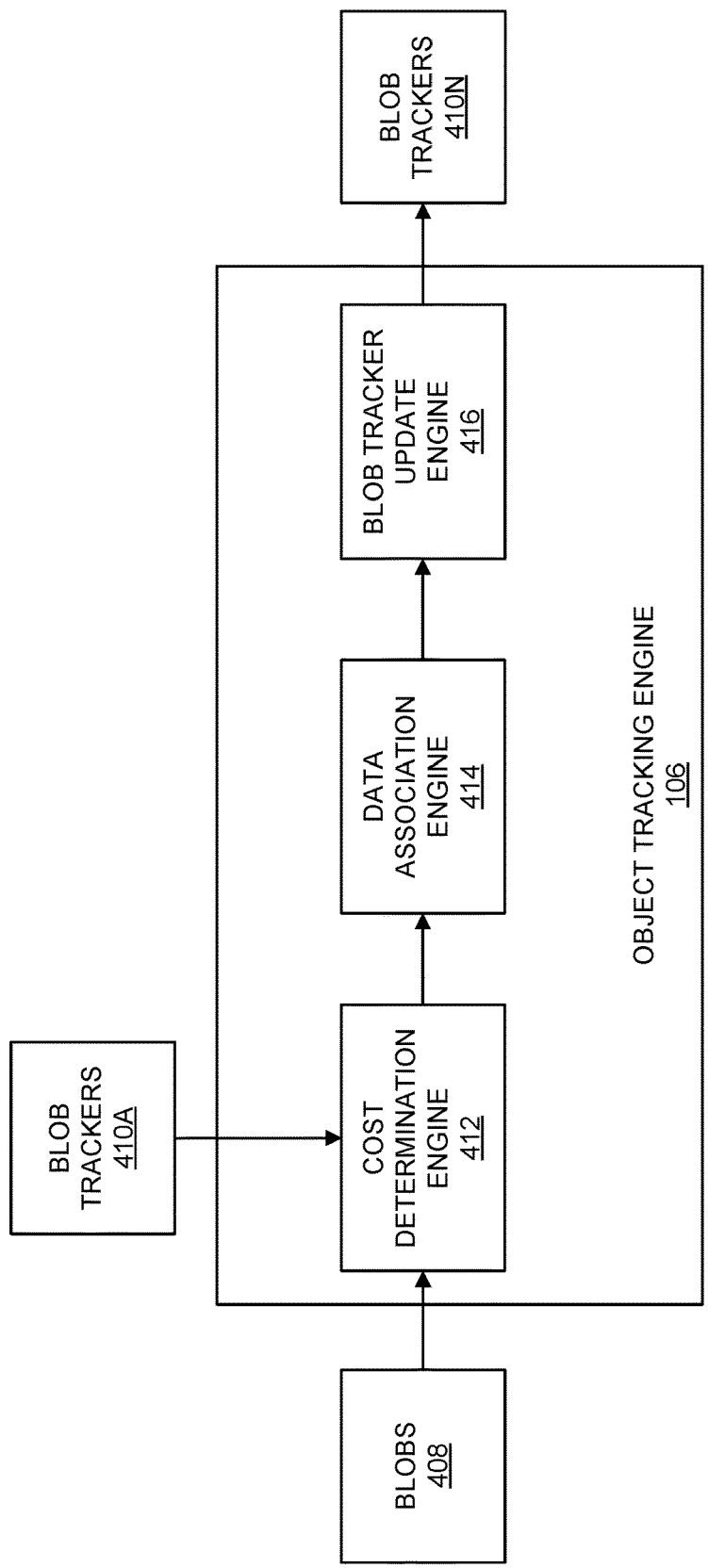
FIG. 4 is a block diagram illustrating an example of an object tracking engine, in accordance with some embodiments.

FIG. 4 is a block diagram illustrating an example of an object tracking engine 106. Object tracking in a video sequence can be used for many applications, including surveillance applications, among many others. For example, the ability to detect and track multiple objects in the same scene is of great interest in many security applications. When blobs (making up at least portions of objects) are detected from an input video frame, blob trackers from the previous video frame need to be associated to the blobs in the input video frame according to a cost calculation. The blob trackers can be updated based on the associated foreground blobs. In some instances, the steps in object tracking can be conducted in a series manner.

A cost determination engine 412 of the object tracking engine 106 can obtain the blobs 408 of a current video frame from the blob detection engine 104. The cost determination engine 412 can also obtain the blob trackers 410A updated from the previous video frame (e.g., video frame A 202A). A cost function can then be used to calculate costs between the blob trackers 410A and the blobs 408. Any suitable cost function can be used to calculate the costs. In some examples, the cost determination engine 412 can measure the cost between a blob tracker and a blob by calculating the Euclidean distance between the centroid of the tracker (e.g., the bounding box for the tracker) and the centroid of the bounding box of the foreground blob. In one illustrative example using a 2-D video sequence, this type of cost function is calculated as below:

$$COST_{tb} = \sqrt{(t_x - b_x)^2 + (t_y - b_y)^2}$$

The terms $(t_x, t_y)$ and $(b_x, b_y)$ are the center locations of the blob tracker and blob bounding boxes, respectively. As noted herein, in some examples, the bounding box of the blob tracker can be the bounding box of a blob associated with the blob tracker in a previous frame. In some examples, other cost function approaches can be performed that use a minimum distance in an x-direction or y-direction to calculate the cost. Such techniques can be good for certain controlled scenarios, such as well-aligned lane conveying. In some examples, a cost function can be based on a distance of a blob tracker and a blob, where instead of using the center position of the bounding boxes of blob and tracker to calculate distance, the boundaries of the bounding boxes are considered so that a negative distance is introduced when two bounding boxes are overlapped geometrically. In addition, the value of such a distance is further adjusted according to the size ratio of the two associated bounding boxes. For example, a cost can be weighted based on a ratio between the area of the blob tracker bounding box and the area of the blob bounding box (e.g., by multiplying the determined distance by the ratio).

In some embodiments, a cost is determined for each tracker-blob pair between each tracker and each blob. For example, if there are three trackers, including tracker A, tracker B, and tracker C, and three blobs, including blob A, blob B, and blob C, a separate cost between tracker A and each of the blobs A, B, and C can be determined, as well as separate costs between trackers B and C and each of the blobs A, B, and C. In some examples, the costs can be arranged in a cost matrix, which can be used for data association. For example, the cost matrix can be a 2-dimensional matrix, with one dimension being the blob trackers 410A and the second dimension being the blobs 408. Every tracker-blob pair or combination between the trackers 410A and the blobs 408 includes a cost that is included in the cost matrix. Best matches between the trackers 410A and blobs 408 can be determined by identifying the lowest cost tracker-blob pairs in the matrix. For example, the lowest cost between tracker A and the blobs A, B, and C is used to determine the blob with which to associate the tracker A.

Data association between trackers 410A and blobs 408, as well as updating of the trackers 410A, may be based on the determined costs. The data association engine 414 matches or assigns a tracker with a corresponding blob and vice versa. For example, as described previously, the lowest cost tracker-blob pairs may be used by the data association engine 414 to associate the blob trackers 410A with the blobs 408. Another technique for associating blob trackers with blobs includes the Hungarian method, which is a combinatorial optimization algorithm that solves such an assignment problem in polynomial time and that anticipated later primal-dual methods. For example, the Hungarian method can optimize a global cost across all blob trackers 410A with the blobs 408 in order to minimize the global cost. The blob tracker-blob combinations in the cost matrix that minimize the global cost can be determined and used as the association.

In addition to the Hungarian method, other robust methods can be used to perform data association between blobs and blob trackers. For example, the association problem can be solved with additional constraints to make the solution more robust to noise while matching as many trackers and blobs as possible.

Regardless of the association technique that is used, the data association engine 414 can rely on the distance between the blobs and trackers. The location of the foreground blobs are identified with the blob detection engine 104. However, a blob tracker location in a current frame may need to be predicted from a previous frame (e.g., using a location of a blob associated with the blob tracker in the previous frame). The calculated distance between the identified blobs and estimated trackers is used for data association. After the data association for the current frame, the tracker location in the current frame can be identified with the location of its associated blob(s) in the current frame. The tracker's location can be further used to update the tracker's motion model and predict its location in the next frame.

Once the association between the blob trackers 410A and blobs 408 has been completed, the blob tracker update engine 416 can use the information of the associated blobs, as well as the trackers' temporal statuses, to update the states of the trackers 410A for the current frame. Upon updating the trackers 410A, the blob tracker update engine 416 can perform object tracking using the updated trackers 410N, and can also provide the update trackers 410N for use for a next frame.

The state of a blob tracker can include the tracker's identified location (or actual location) in a current frame and its predicted location in the next frame. The state can also, or alternatively, include a tracker's temporal status. The temporal status can include whether the tracker is a new tracker that was not present before the current frame, whether the tracker has been alive for certain frames, or other suitable temporal status. Other states can include, additionally or alternatively, whether the tracker is considered as lost when it does not associate with any foreground blob in the current frame, whether the tracker is considered as a dead tracker if it fails to associate with any blobs for a certain number of consecutive frames (e.g., 2 or more), or other suitable tracker states.

Other than the location of a tracker, there may be other status information needed for updating the tracker, which may require a state machine for object tracking. Given the information of the associated blob(s) and the tracker's own status history table, the status also needs to be updated. The state machine collects all the necessary information and updates the status accordingly. Various statuses can be updated. For example, other than a tracker's life status (e.g., new, lost, dead, or other suitable life status), the tracker's association confidence and relationship with other trackers can also be updated. Taking one example of the tracker relationship, when two objects (e.g., persons, vehicles, or other objects of interest) intersect, the two trackers associated with the two objects will be merged together for certain frames, and the merge or occlusion status needs to be recorded for high level video analytics.

One method for performing a tracker location update is using a Kalman filter. The Kalman filter is a framework that includes two steps. The first step is to predict a tracker's state, and the second step is to use measurements to correct or update the state. In this case, the tracker from the last frame predicts (using the blob tracker update engine 416) its location in the current frame, and when the current frame is received, the tracker first uses the measurement of the blob(s) to correct its location states and then predicts its location in the next frame. For example, a blob tracker can employ a Kalman filter to measure its trajectory as well as predict its future location(s). The Kalman filter relies on the measurement of the associated blob(s) to correct the motion model for the blob tracker and to predict the location of the object tracker in the next frame. In some examples, if a blob tracker is associated with a blob in a current frame, the location of the blob is directly used to correct the blob tracker's motion model in the Kalman filter. In some examples, if a blob tracker is not associated with any blob in a current frame, the blob tracker's location in the current frame is identified as its predicted location from the previous frame, meaning that the motion model for the blob tracker is not corrected and the prediction propagates with the blob tracker's last model (from the previous frame).

Regardless of the tracking method being used, a new tracker starts to be associated with a blob in one frame and, moving forward, the new tracker may be connected with possibly moving blobs across multiple frames. When a tracker has been continuously associated with blobs and a duration has passed, the tracker may be promoted to be a normal tracker and output as an identified tracker-blob pair. A tracker-blob pair is output at the system level as an event (e.g., presented as a tracked object on a display, output as an alert, or other suitable event) when the tracker is promoted to be a normal tracker. In some implementations, a normal tracker (e.g., including certain status data of the normal tracker, the motion model for the normal tracker, or other information related to the normal tracker) can be output as part of object metadata. The metadata, including the normal tracker, can be output from the video analytics system (e.g., an IP camera running the video analytics system) to a server or other system storage. The metadata can then be analyzed for event detection (e.g., by rule interpreter). A tracker that is not promoted as a normal tracker can be removed (or killed), after which the tracker can be considered as dead.

As described above, blob detection can be performed for one or more video frames to generate or identify blobs for the one or more video frames. Temporal information of the blobs can be used to identify stable objects or blobs so that a tracking layer can be established. For example, a cost (e.g., a distance) between the blob trackers and blobs can be calculated, and data association can be performed to associate the trackers and blobs using the calculated costs (e.g., using a cost matrix). The blob trackers can then be updated according to the data association, in which case the updated state and location can be calculated and the tracking of the current frame can be fulfilled.

Object tracking tries to detect and track objects and output metadata about the objects detected from the field of view. However, it is common for the video analytics system to detect false positive objects. For example, blob detection may detect one or more false positive blobs for the false positive objects in a frame. A false positive blob may be output as a tracked object when a blob tracker associated with the false positive blob is converted to a normal status, causing a false positive object to be tracked. False positive objects can include background objects that should not be tracked, including moving foliage due to wind or other external event, an object (e.g., umbrella, flag, balloon, or other object) that is generally static but has some movement due to external elements (e.g., wind, a person brushing the object, or other cause), glass doors, objects detected due to lighting condition changes, isolated shadows, objects detected due to shadows of real objects, and any other types of background objects that may have movement. False positive objects are common and can have a serious impact on the performance of the video analytics system. Tracking of false positive objects can even cause the system to trigger false alarms. In some cases, false positive objects can be irregular in size and can have an irregular or arbitrary moving direction or velocity magnitude compared to real objects. In some cases, false positive objects can remain still (e.g., objects due to lighting condition changes, such as a shadow from overcast cloud, or other suitable false positive objects).

Figure 5:
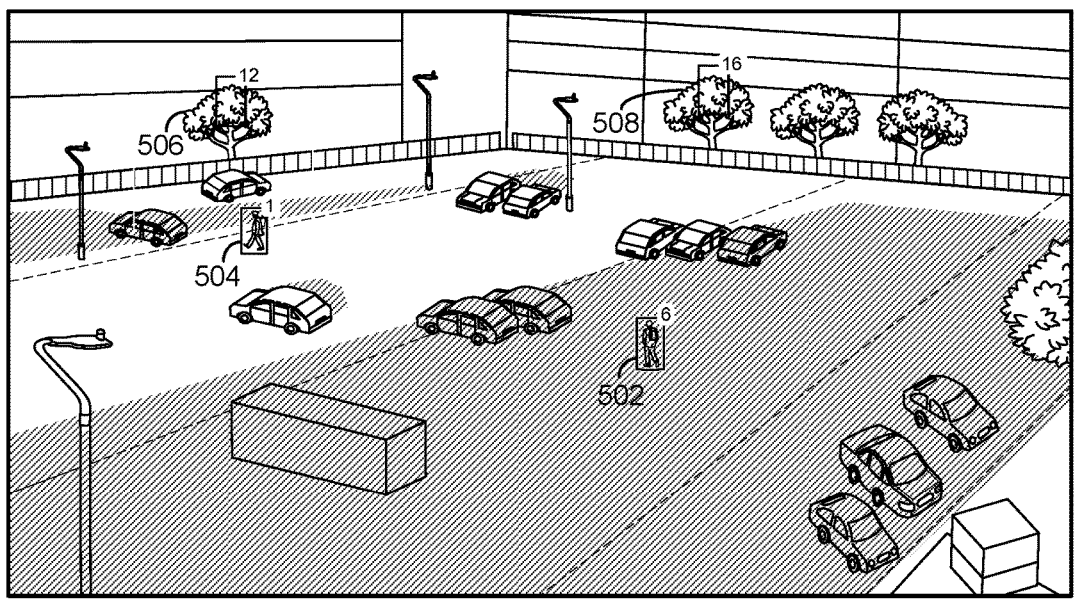
FIG. 5 is an illustration of a video frame of an environment in which various objects are tracked, in accordance with some embodiments.

FIG. 5 illustrates an example of a video frame 500 of an environment in which various objects are tracked. The objects being tracked for the video frame 500 include a person 502, a person 504, a portion of a tree 506, and a portion of a tree 508. The tracked objects are shown with their respective bounding boxes. The person 502 and person 504 are real objects, and are tracked with a blob tracker with tracker ID 6 and a blob tracker with tracker ID 1, respectively. However, the trees 506 and 508 are false positive objects that were detected during blob detection, due to slight movement of the portions of the trees 506 and 508 being tracked. The trackers (with IDs 12 and 16) associated with the blobs detected for the trees 506 and 508 are continuously associated with the trees 506 and 508 for a threshold duration, and thus are converted to a normal status. As a result, the tracker with ID 12 is output for tracking the portion of the tree 506 and the tracker with ID 16 is output for tracking the portion of the tree 508. Using the techniques described herein, the trackers with ID 12 and ID 16 associated with the trees 506 and 508 may be detected as jumping trackers (described below) before they are converted to a normal state, and can be removed from the trackers maintained by the video analytics system.

Figure 6:
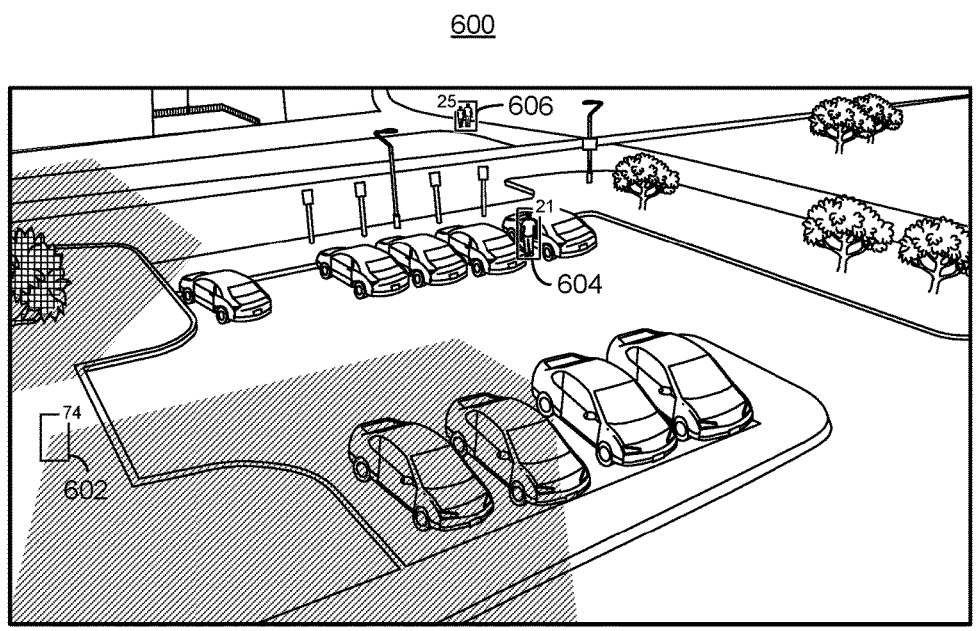
FIG. 6 is an illustration of another video frame of an environment in which various objects are tracked, in accordance with some embodiments.

FIG. 6 illustrates another example of a video frame 600 of an environment in which various objects are tracked. The objects being tracked for the video frame 600 include a portion of a shadow 602, a person 604, a group of persons 606. The tracked objects are shown with their respective bounding boxes. The person 604 and persons 606 are real objects that should be tracked. Blob trackers with tracker ID 21 and tracker ID 25 are used to track the person 604 and the persons 606, respectively. The shadow 602 is a false positive object detected during blob detection, due to movement of the portion of the shadow 602 as the sun moves. The tracker (with ID 74) associated with the blob detected for the portion of the shadow 602 is continuously associated with the portion of the shadow 602 for a threshold duration, and is then converted to a normal status. When converted to normal, the tracker with ID 74 is output for tracking the portion of the shadow 602. Using the techniques described herein, the tracker with ID 74 may be detected as frozen or freeze tracker (described below) before it can be converted to a normal state, and can be removed from the trackers maintained by the video analytics system.

Figure 7:
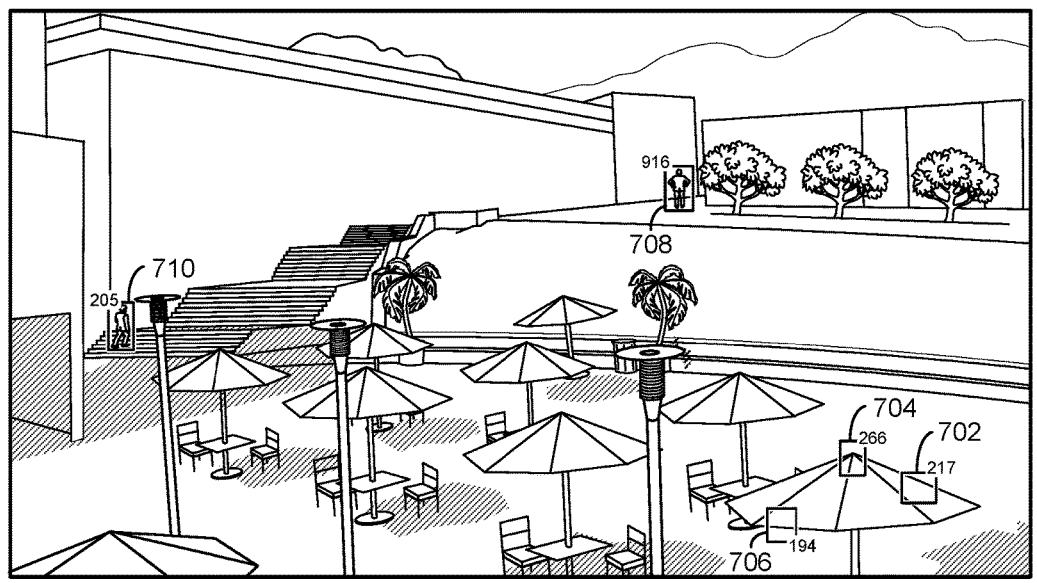
FIG. 7 is an illustration of another video frame of an environment in which various objects are tracked, in accordance with some embodiments.

FIG. 7 illustrates another example of a video frame 700 of an environment in which various objects are tracked. The objects being tracked for the video frame 700 include a side portion 702 of an umbrella, a top portion 704 of an umbrella, a front portion 706 of an umbrella, a person 708, and a person 710. The tracked objects are shown with their respective bounding boxes. The person 708 and person 710 are real objects that are of interest for tracking by a video analytics system. Blob trackers with tracker ID 916 and tracker ID 205 are used to track the person 708 and the person 710, respectively. The side portion 702, the top portion 704, and the front portion 706 of the umbrella are false positive objects detected during blob detection, due to movement of the umbrella (e.g., due to wind, due a person moving the umbrella, due to rain, or other cause). The trackers (trackers with ID 217, ID 266, and ID 194) associated with the blobs detected for the side portion 702, the top portion 704, and the front portion 706 of the umbrella are continuously associated with the portions 702, 704, 706 for a threshold duration, causing the trackers to be converted to a normal status. When converted to normal, the trackers with ID 217, ID 266, and ID 194 are output for tracking the side portion 702, the top portion 704, and the front portion 706 of the umbrella, as shown in FIG. 7. Using the techniques described herein, the trackers with ID 217, ID 266, and ID 194 may be detected as jumping trackers (described below) before they can be converted to a normal state, and can be removed from the trackers maintained by the video analytics system.

Systems and methods are described herein for maintaining blob trackers (or object trackers) to remove false positive blobs. For example, blob trackers can be maintained by keeping some blob trackers for possible conversion to a normal status and removing other false positive blob trackers before the false positive blob trackers are converted to a normal status. The false positive blobs can be detected and removed based on common characteristics of false positive objects (for which the blobs are generated), such as objects that remain still or static and objects that move in an arbitrary direction and/or with irregular direction and speed. The systems and methods described herein can monitor a history of the bounding boxes associated with each blob tracker (e.g., size and location information of the bounding boxes), connections between blob trackers, a history of states of blob trackers, a combination thereof, or other suitable factors in order to identify and remove false positive blob trackers from a maintained set of blob trackers for a video sequence. In some examples, the object tracking engine 106 can perform the methods described herein. The proposed techniques may work independently or jointly to improve object tracking.

As described above, blob trackers can have various temporal states, such as a new state for a tracker of a current frame that was not present before the current frame, a lost state for a tracker that is not associated or matched with any foreground blob in the current frame, a dead state for a tracker that fails to associate with any blobs for a certain number of consecutive frames (e.g., 2 or more frames, a threshold duration, or the like), a normal state for a tracker that is to be output as an identified tracker-blob pair to the video analytics system, or other suitable tracker states.

Another temporal state that can be maintained for a blob tracker is a duration of the tracker. The duration of a blob tracker includes the number of frames (or other temporal measurement, such as time) the tracker has been associated with one or more blobs.

Figure 8:
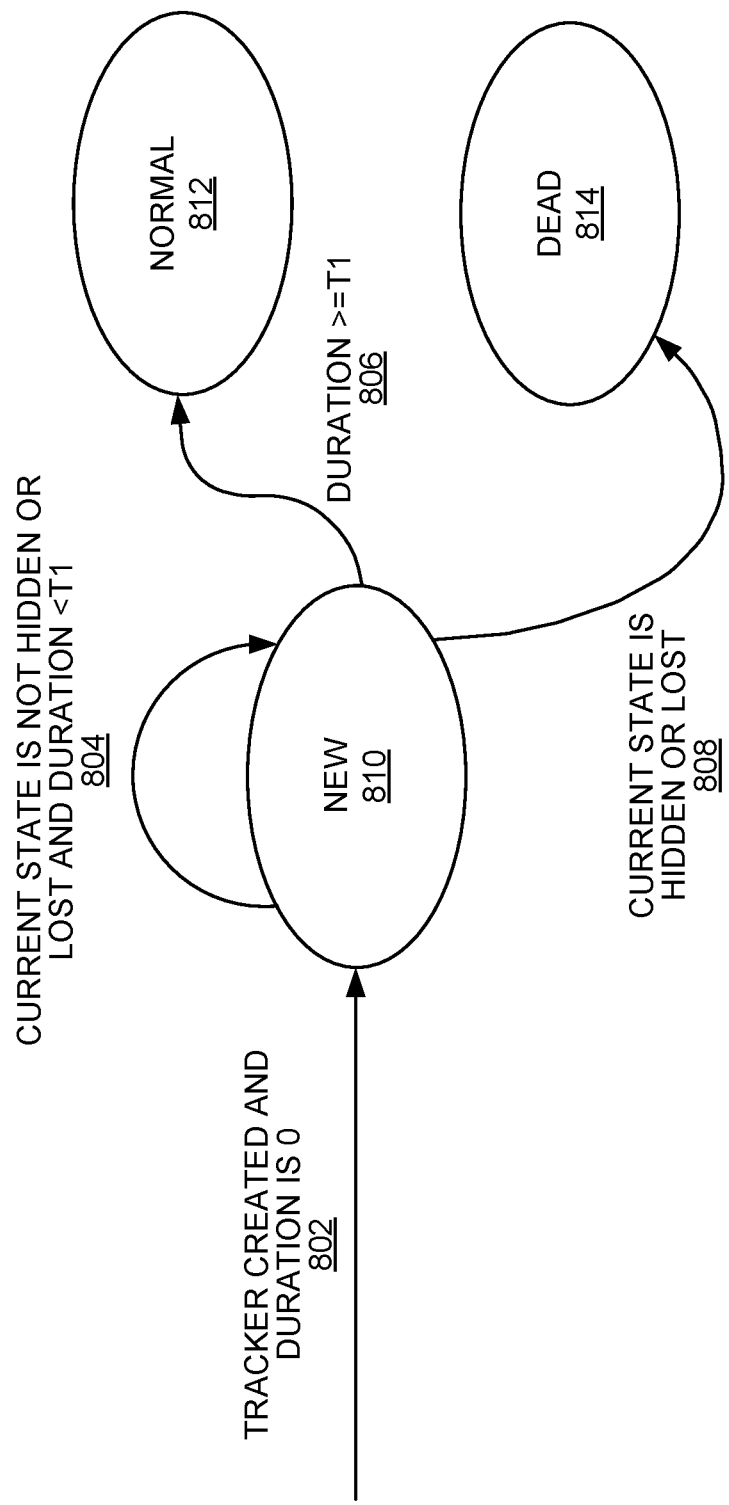
FIG. 8 is a state diagram illustrating an example of a new tracker transition process, in accordance with some embodiments.

A blob tracker can be promoted or converted to be a normal tracker when certain conditions are met. FIG. 8 is a state diagram illustrating an example of a new tracker transition process. A tracker is given a new state 810 when the tracker is created and its duration of being associated with any blobs is 0 (shown at 802). The duration of the blob tracker can be monitored as well as its temporal state (new, lost, hidden, or the like). As shown at 804, as long as the current state is not hidden or lost, and as long as the duration is less than a threshold duration T1, the state of the new tracker is kept as a new state 810. A hidden tracker may refer to a tracker that was previously normal (thus independent), but later merged into another tracker C. In order to enable this hidden tracker to be identified later due to the anticipation that the merged object may be split later, it is still kept as associated with the other tracker C which is containing it.

The threshold duration T1 is a duration that a new blob tracker must be continuously associated with one or more blobs before it is converted to a normal tracker (transitioned to a normal state 812). The threshold duration can be a number of frames (e.g., at least N frames) or an amount of time. In one illustrative example, a blob tracker can be in a new state for 30 frames, or any other suitable number of frames or amount of time, before being converted to a normal tracker. If the blob tracker has been continuously associated with blobs for the threshold duration (duration≥T1), as shown at 806, and continuously being detected out (thus does not become hidden or lost during) and associated with the same tracker during the threshold duration, the blob tracker is converted to a normal tracker by being transitioned from a new status to a normal status, as shown at 812.

If, during the threshold duration T1, the new tracker becomes hidden or lost (e.g., not associated or matched with any foreground blob), as shown at 808, the state of the tracker can be transitioned from new 810 to dead 814, and the blob tracker can be removed from blob trackers maintained for a video sequence.

In some examples, objects may intersect or group together, in which case the blob detection engine 104 can detect one blob (a merged blob) that contains more than one object of interest (e.g., multiple objects that are being tracked). For example, as a person walks near another person in a scene, the bounding boxes for the two persons can become a merged bounding box (corresponding to a merged blob). The merged bounding box can be tracked with a single blob tracker (referred to as a container tracker), which can include one of the blob trackers that was associated with one of the blobs making up the merged blob, with the other blob(s)' trackers being referred to as merge-contained trackers. For example, a merge-contained tracker is a tracker (new or normal) that was merged with another tracker when two blobs for the respective trackers are merged, and thus became hidden and carried by the container tracker.

A tracker that is split from an existing tracker is referred to as a split-new tracker. The tracker from which the split-new tracker is split is referred to as a parent tracker or a split-from tracker. In some examples, a split-new tracker can result from the association (or matching or mapping) of multiple blobs to one active tracker. For instance, one active tracker can only be mapped to one blob. All the other blobs (the blobs remaining from the multiple blobs that are not mapped to the tracker) cannot be mapped to any existing trackers. In such examples, new trackers will be created for the other blobs, and these new trackers are assigned the state "split-new." Such a split-new tracker can be referred to as the child tracker of the original tracker its associated blob is mapped to. The corresponding original tracker can be referred to as the parent tracker (or the split-from tracker) of the child tracker. In some examples, a split-new tracker can also result from a merge-contained tracker. As noted above, a merge-contained tracker is a tracker that was merged with another tracker (when two blobs for the respective trackers are merged) and thus became hidden and carried by the container tracker. A merge-contained tracker can be split from the container tracker if the container tracker is active and the container tracker has a mapped blob in the current frame.

As previously described, the threshold duration T1 is a duration that a new blob tracker must be continuously associated with one or more blobs before it is converted to a normal tracker. A threshold duration T2 is a duration a split-new tracker must be continuously associated with one or more blobs before it is converted to a normal tracker. The threshold duration T2 used for split-new trackers can be the same as the threshold duration T1 used for new trackers (e.g., 20 frames, 30 frames, 32 frames, 60 frames, 1 second, 2 seconds, or other suitable duration or number of frames). In some examples, the threshold duration T2 for split-new trackers can be a shorter duration than the threshold duration T1 used for new trackers. For example, T2 can be set to a smaller value than T1. In some examples, the duration T2 can be proportional to T1. In one illustrative example, T1 may indicate just one second of duration, and thus is equal to the (average) frame rate of the input video (e.g., 30 frames at 30 frames per second (fps), 60 frames at 60 fps, or other suitable duration and frame rate). In such an example, the duration T2 can be set to half of T1.

Figure 9:
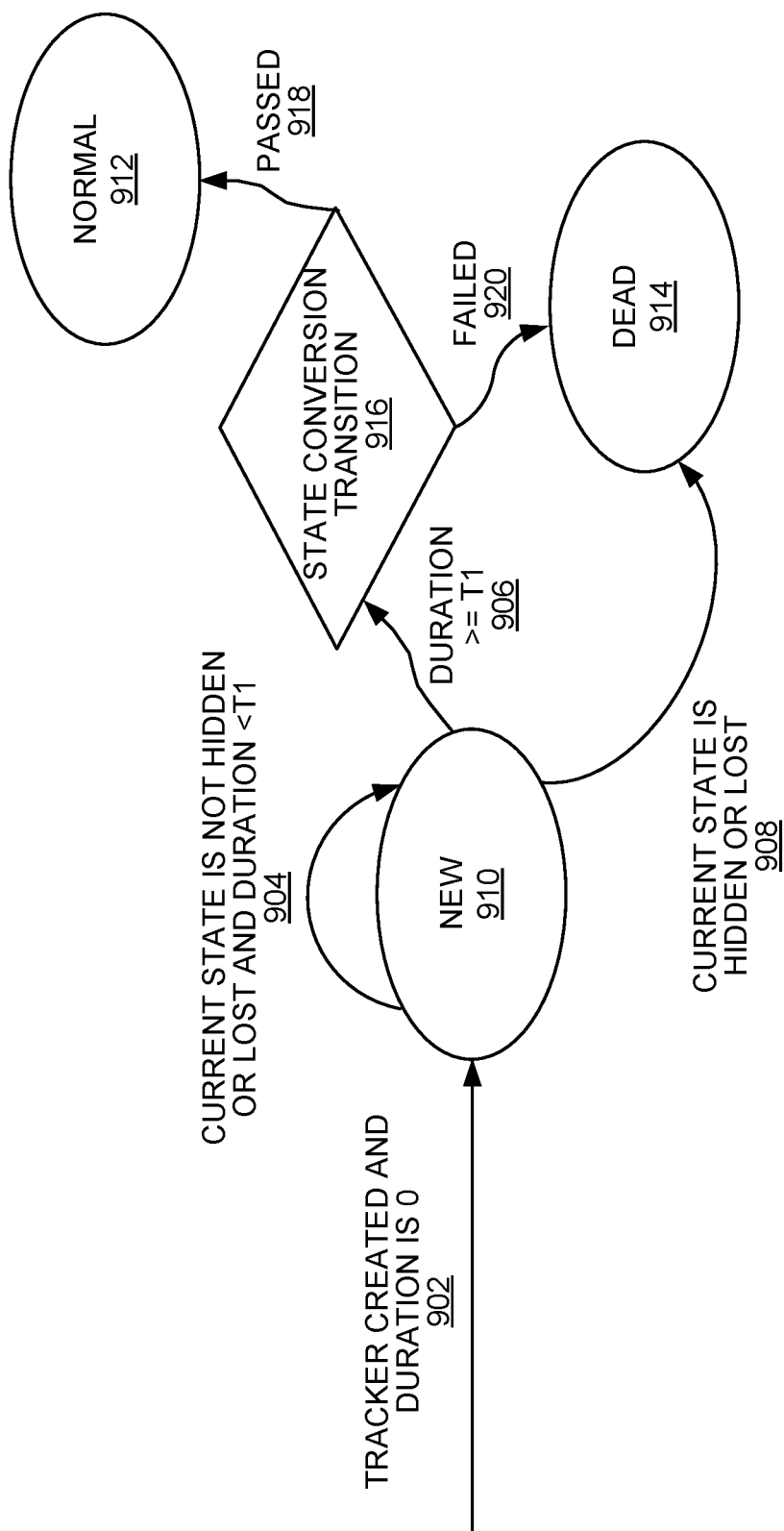
FIG. 9 is a state diagram illustrating an example of new tracker transition using a state conversion transition process, in accordance with some embodiments.

The object tracking engine 106 can perform a state conversion transition process to maintain blob trackers and to remove false positive blob trackers, according to the systems and methods described herein. FIG. 9 is a state diagram illustrating an example of new tracker transition process that also uses a state conversion transition process at 916. The state conversion transition process 916 can be applied to the currently maintained trackers for each frame. For example, after a threshold duration T1 for a new tracker (or a threshold duration T2 for a split-new tracker), the state conversion transition process 916 can be used to decide whether the new (or split-new) tracker needs to be converted to a normal state 912 (and thus an outputted tracker) or transitioned to a dead state 914.

A tracker is given a new state 910 when the tracker is created and its duration of being associated with any blobs is 0 (shown at 902). As shown at 904, as long as the current state is not hidden or lost, and as long as the duration is less than the threshold duration T1 (or threshold duration T2 for a split-new tracker), the state of the new tracker is kept as a new state 910. If, during the threshold duration T1 (or T2), the new (or split-new) tracker becomes hidden or lost, as shown at 908, the state of the tracker can be transitioned from new 910 to dead 914, and the blob tracker can be removed from blob trackers maintained for a video sequence.

If the blob tracker has been continuously associated with blobs for the threshold duration (duration≥T1), as shown at 906, and thus does not become hidden or lost during the threshold duration T1 (or T2), the blob tracker is processed using the state conversion transition process 916. The state conversion transition process 916 decides whether the new (or split-new) tracker needs to be converted to a normal state 912 (by passing the state conversion transition process at 918) or transitioned to a dead state 914 (by failing the state conversion transition process at 920).

A new (or split-new) tracker that is alive (not removed or killed) and that continues until the state conversion transition process 916 is associated with a history of bounding boxes. In some examples, the history of bounding boxes associated with the new (or split-new) tracker includes the bounding box of the currently associated blob from the current frame, a blob associated with the tracker from the previous frame, and the tracker's associated blobs in all previous frames since the tracker was firstly created.

Figure 10:
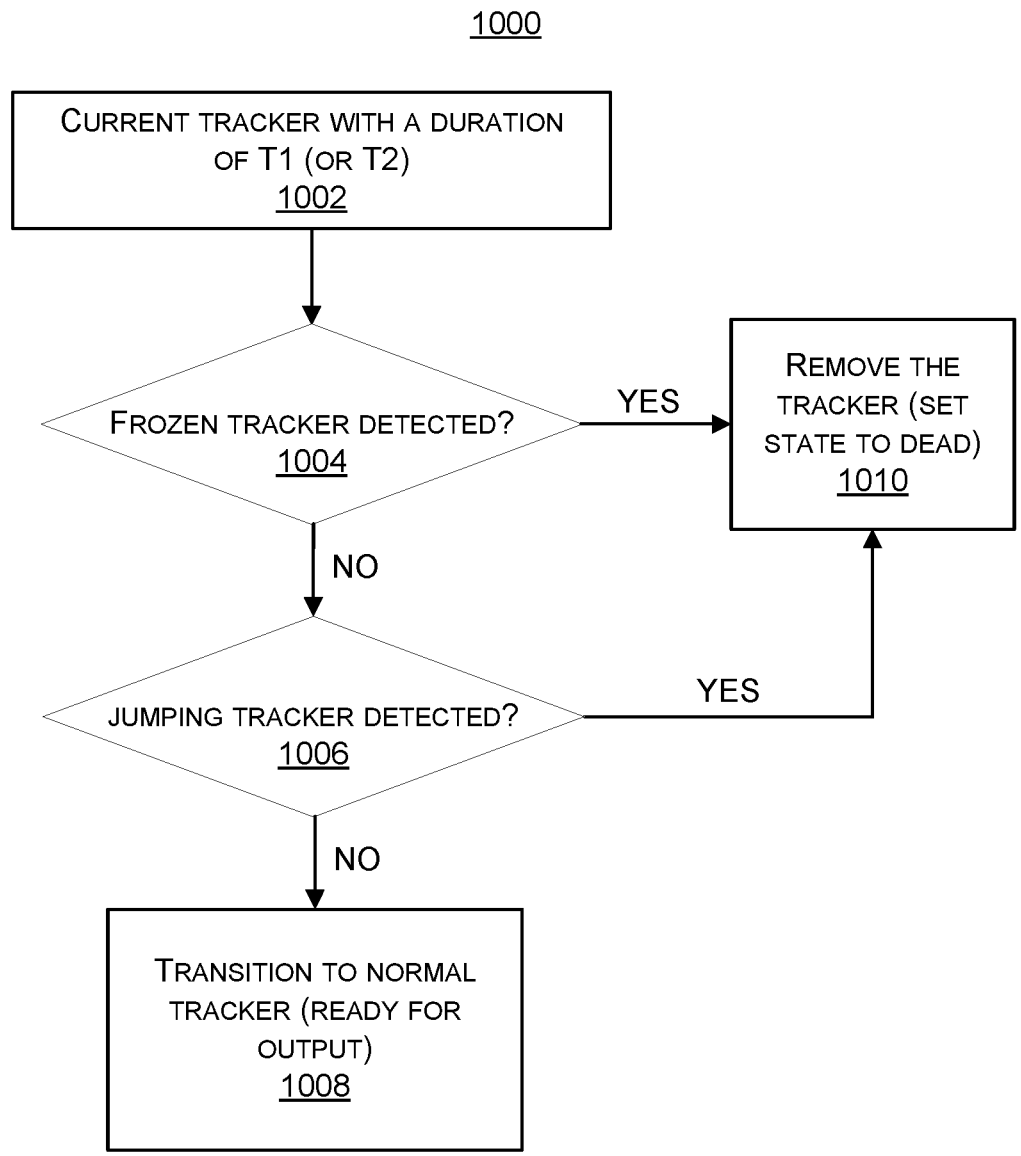
FIG. 10 is a flowchart illustrating an embodiment of a state conversion transition process, in accordance with some embodiments.

FIG. 10 illustrates an example of a state conversion transition process 1000. The state conversion transition process 1000 corresponds to the state conversion transition process 916 shown in FIG. 9 and the state conversion transition process 1116 shown in FIG. 11. The steps of the process 1000 include an example framework of the state conversion transition process. At 1002, the process 1000 includes determining that a current blob tracker has a duration of greater than or equal to T1 (or only greater than in some cases) for a new tracker. For a split-new tracker, the process 1000 at step 1002 can determine that the split-new tracker has a duration greater than or equal to T2 (or only greater than in some cases). Step 1002 can correspond to the new state 910 shown in FIG. 9. As noted previously, the threshold duration T1 is a duration that a new blob tracker must be continuously associated with one or more blobs before it is converted to a normal tracker, and the threshold duration T2 is a duration a split-new tracker must be continuously associated with one or more blobs before it is converted to a normal tracker.

Using the state conversion transition process, the object tracking engine 106 can identify at least two different types of blob tracker histories as false positives. For example, the process 1000 includes at least two major sub-processes 1004 and 1006 that detect whether a blob tracker is a first special type of tracker (denoted as a frozen tracker or a freeze tracker) or a second special type of tracker (denoted as a jumping tracker), respectively.

The first type of blob tracker history includes tracker history for foreground blobs (and the objects they represent) that are relatively frozen or still. Trackers of the first type are denoted as frozen trackers or freeze trackers. A freeze tracker has almost no movement and thus is either a noise blob and/or potentially does not belong to an object of interest (e.g., a person, a car, or other object of interest) or event of interest. At 1004, the process 1000 determines whether the current blob tracker is a frozen tracker. If the current blob tracker is determined to be a frozen tracker at 1004, the blob tracker is removed at 1010 (e.g., by being set to a dead state 914). Further details regarding frozen trackers are described below.

The second type of blob tracker history includes tracker history for foreground blobs (and the objects they represent) of moving foreground objects whose size and/or motion are too irregular to be an object of interest. Trackers of the second type are denoted as jumping trackers. Further details regarding jumping trackers are described below. At 1006, the process 1000 determines whether the current blob tracker is a jumping tracker. If the current blob tracker is determined to be a jumping tracker at 1006, the blob tracker is removed at 1010 (e.g., by being set to a dead state 914). While the detection of a current tracker as jumping tracker at 1006 is shown as being performed after the detection of the current tracker as a frozen tracker at 1004, one of ordinary skill will appreciate that a tracker can be evaluated as being a jumping tracker before it is evaluated as being a frozen tracker, or that a tracker can be evaluated as being a jumping tracker and a frozen tracker at the same time.

Because the bounding boxes of a blob tracker can be the bounding boxes of blobs associated with the blob tracker (e.g., a blob in a previous frame for a predicted location of a tracker or a blob in a current frame for an actual location of a tracker, as described above), the size, motion, velocity, or other characteristic of a blob tracker corresponds to the same characteristic of an associated blob. Hence, the tracking engine 106 can use the history of tracker characteristics to identify frozen, jumping, and other kinds of blobs and objects, and to prevent such objects from being output and tracked.

As shown in FIG. 10, if the current blob tracker is detected as being a special type of tracker, the process 1000 removes the current tracker at 1010. Otherwise, at 1008, the current blob tracker can be converted to normal (for output) at 1008. In some cases, the state conversion transition process 1000 can be considered as a unified framework to add as many types of checks as possible to remove false positives.

As shown in FIG. 9 and FIG. 10, the state conversion transition process 916 or 1000 can lead to different results. For example, an object can be determined to be a real object when an associated blob tracker (associated with the blob representing at least a portion of the object) is converted to a normal state 912, and thus the bounding box for the real object can start to be output to the system (e.g., for display as a tracked object). As another example, an object can be determined to be a false positive object, and thus will be removed (or killed) from the list of trackers to be maintained by being transitioned to a dead state 914. In some cases, a removed tracker may correspond to one or more blobs that will immediately show up in subsequent frames, and such detected blobs again will be associated to new trackers. In some examples, the new trackers will not be logically considered as a same tracker as any of the previously removed (or killed) trackers.

A new (or split-new) tracker may be removed before it is converted into a normal tracker, as shown in FIG. 9. For example, if the new tracker has been present with a duration smaller than the threshold duration T1 (or T2 for split-new trackers), and is currently lost (no matching of any blob), the tracker may be killed and transitioned to a dead state 914. In some examples, if and only if the duration of a blob tracker is equal to the threshold duration T1 (or T2), the state conversion transition process 916 will be applied, which can reduce the complexity of invoking the state conversion transition process 916 multiple times for each tracker or for each frame by only invoking the state conversion transition process 916 when a tracker is continuously associated with blobs for a duration greater than the threshold duration T1 (or T2).

In some examples, a blob tracker detected as a false positive in the state conversion transition process 916 can be removed immediately. In some examples, a blob tracker detected as a false positive in the state conversion transition process 916 can be considered as suspicious, in which case the tracker will not be immediately removed. For example, in implementations in which a tracker is designated as a suspicious tracker, the suspicious tracker can be kept for a longer duration before the state conversion transition process is applied again. For instance, a blob tracker that fails to pass the state conversion transition process 916 may not immediately lead to removal of the tracker, but may lead to an additional duration the blob tracker must wait before being tested again by the state conversion transition process 916.

Figure 11:
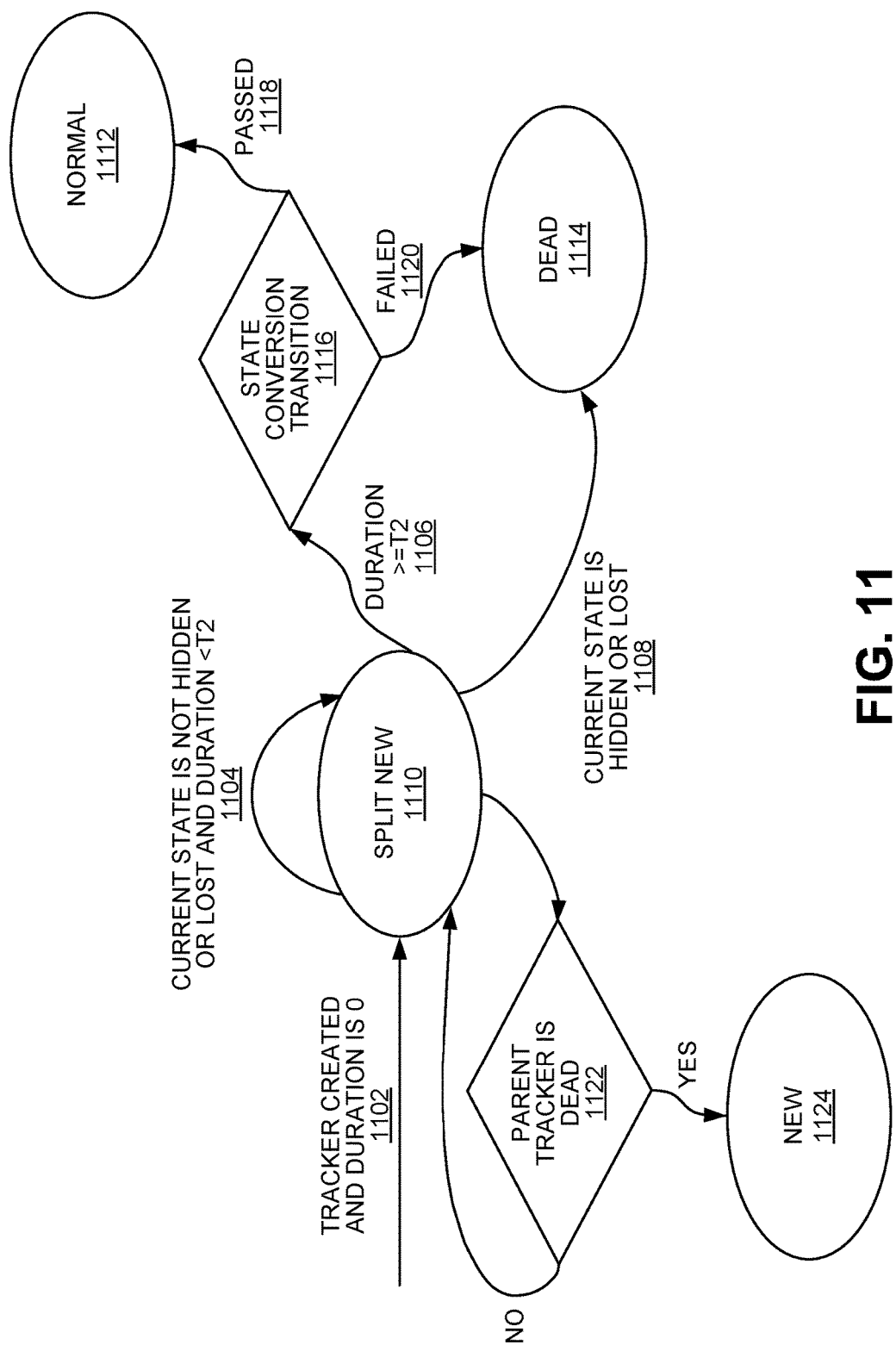
FIG. 11 is a state diagram illustrating an example of new tracker transition using a state conversion transition process and a split-new state transition, in accordance with some embodiments.

FIG. 11 is a state diagram illustrating an example of new tracker transition process that includes a state conversion transition process 1116 and a split-new state transition. As shown in FIG. 11, in some examples, a split-new tracker can be converted to a new tracker to allow the split-new tracker to have a longer duration (e.g., a T1 duration instead of a T2 duration) before being considered for a state conversion transition process when one or more conditions are true. For example, a condition can include that the unique parent tracker (also referred to as a split-from tracker) of the split-new tracker has been removed or killed and thus has a dead state.

As shown at 1102, a split-new tracker is given a split-new state 1110 when the split-new tracker is created (when split from the parent tracker) and its duration of being associated with any blobs is 0. If, during the threshold duration T2, the split-new tracker becomes hidden or lost, as shown at 1108, the state of the split-new tracker can be transitioned from new 1110 to dead 1114, and the split-new blob tracker can be removed from blob trackers maintained for a video sequence.

If the split-new blob tracker has been continuously associated with blobs for the threshold duration (duration≥T2), as shown at 1106, and thus does not become hidden or lost during the threshold duration T2, the split-new blob tracker is processed using the state conversion transition process 1116. The state conversion transition process 1116 can be similar to and perform similar operations to split-new trackers as the state conversion transition processes 916 and/or 1000 described above. For example, the state conversion transition process 1116 decides whether the new (or split-new) tracker needs to be converted to a normal state 1112 for output (by passing the state conversion transition process at 1118) or transitioned to a dead state 1114 (by failing the state conversion transition process at 1120).

As shown at 1104, as long as the current state of the split-new tracker is not hidden or lost, and as long as the duration is less than the threshold duration T2, the state of the split-new tracker is kept as a new state 1110. While in the split-new state 1110, the new tracker transition process can determine whether to transition the split-new tracker from a split-new state to a new state 1124. For example, at 1122, the state of the parent (or split-from) tracker of the current split-new tracker is evaluated to determine whether the parent tracker has been removed or killed. If, at 1122, the state of the parent tracker is determined to be dead (removed or killed), the split-new state of the split-new tracker is converted to a new state. The parent tracker can be determined to be dead due to one or more of the examples described above. In one illustrative example, the parent tracker can be determined to be a false positive tracker during the state conversion transition process (as shown in 920 of FIG. 9 or steps 1004 or 1006 of FIG. 10). In another illustrative example, the parent tracker can be determined to have become hidden or lost during the threshold duration T1 (as shown in 908 of FIG. 9). In either example, the parent tracker was transitioned from a new state to a dead state. When transitioned from the split-new state to the new state, the threshold duration associated with the split-new tracker is also converted from the T2 duration to the T1 duration. For example, the T1 threshold duration can be longer than the T2 threshold duration, giving the split-new tracker more time before being considered for the state conversion transition process 1116.

If, at 1122, the state of the parent tracker is determined to not be dead (e.g., to be alive), the split-new state of the split-new tracker is maintained and the duration and state of the split-new tracker are checked at 1104. The split-new tracker can be continuously evaluated at 1104 and 1122 until the split-new tracker is converted to a dead state at 1114 (e.g., the split-new tracker becomes hidden or lost during the threshold duration T2), the state conversion transition 1116 is invoked (e.g., the split-new tracker has been continuously associated with blobs for the threshold duration T2), or is converted to a new state (e.g., the parent tracker is determined to be dead).

To enable the transition of a tracker from a split-new state to a new state, a tracker identifier (ID) or label can be maintained for a newly split tracker (a split-new tracker) to indicate the parent tracker from which the split-new tracker is split. In some examples, a split of the split-new tracker from the parent tracker can be identified at the blob tracker stage (e.g., during blob association) performed by the object tracking engine 106. For example, the object tracking engine 106 can identify a split has occurred when a single tracker (the parent tracker) is associated with multiple blobs by the data association engine 414. When such a situation is detected, the object tracking engine 106 can generate the split-new tracker. When the split is detected, the tracker ID or label can be generated for the split-new tracker to indicate the parent tracker as the tracker from which the split-new tracker is split. The tracker ID of the parent tracker can be maintained for the split-new tracker in addition to the tracker ID of the split-new tracker. The tracker ID or label thus indicates the parent (or split-from) tracker, and allows the new tracker transition process to identify the parent tracker in order to monitor the state of the parent tracker.

As noted above, the object tracking engine 106 can use the state conversion transition process to identify at least two different types of blob tracker histories as false positives, including a frozen tracker (and a corresponding frozen object) and a jumping tracker (and a corresponding jumping object). The object tracking engine 106 can perform freeze tracker or object detection (e.g., step 1004 in FIG. 10) to check if an object (and its corresponding tracker) is still with very small motion. If an object is still in a location, judging from its bounding box history, the state conversion transition process considers it as a false positive. The false positive frozen tracker fails to be transitioned to a normal tracker, and thus is removed (or killed), as previously described.

In some examples, an alignment threshold and an overlapping ratio between bounding boxes of a tracker can be used to detect frozen objects and frozen trackers. The overlapping ratio can be compared to the alignment threshold to determine if the tracker is still or static in the current frame (relative to a previous frame). The alignment threshold (denoted as $F_{Align}$) indicates how much of overlap in terms of percentage (e.g., normalized to 0 and 1) the history of bounding boxes of a current blob tracker aligns. The current blob tracker is the tracker currently being analyzed in the current frame. In some cases, the alignment threshold $F_{Align}$ can be set to be adaptive to the size of a current bounding box. Furthermore, a small size may corresponds to a smaller alignment threshold. The current bounding box can be the bounding box for the current blob tracker, determined from the bounding box of the current blob with which the current blob tracker is associated. In some examples, the alignment threshold $F_{Align}$ can be set to a relatively bigger value for a smaller bounding box below a first size threshold, and can be set to a larger value for a larger bounding box above a second size threshold. The first size threshold and the second size threshold can be the same value or a different value. In one illustrative example, the alignment threshold $F_{Align}$ is set as follows:

$$F_{Align} = \begin{cases} 0.7, & \text{if size} < T_A \\ 0.85, & \text{if size} > T_B \\ 0.8, & \text{otherwise} \end{cases} \quad \text{Equation (1)}$$

where $T_A$ is the first size threshold, $T_B$ is the second size threshold, and size is the size of the bounding box of the current blob tracker in the current frame. In one illustrative example, $T_A$ can be equal to 129 (e.g., corresponding to a 16×8, 8×16, 4×32, 32×4, or other suitable size bounding box) and $T_B$ can be equal to 4096 (e.g., corresponding to a 64×64, 32×128, 128×32, or other suitable size bounding box). As shown by equation 1, when the size of the bounding box of the current blob tracker is less than $T_A$, the alignment threshold is set to 0.7. When the size of the current bounding box of the current blob tracker is greater than $T_B$, the alignment threshold is set to 0.85, which is much larger than 0.7. When the otherwise condition is met, meaning that the size of the current bounding box is not less than $T_A$ and is not more than $T_B$, the alignment threshold is set to 0.8. One of ordinary skill in the art will appreciate that the example in equation 1 is illustrative, and that any other values of the alignment threshold and the size thresholds $T_A$ and $T_B$ can be used. Further, the less than ("<") and greater than (">") symbols can be replaced with less than or equal to ("≤") and greater than or equal to ("≥") symbols, respectively, without departing from the scope of this description.

In order to measure the level of stillness of the current object (and the corresponding current blob tracker) being tested, an overlapping ratio can be measured. The overlapping ratio includes a ratio of the intersection and union of two bounding boxes of the current blob tracker over two consecutive frames. For example, the two bounding boxes can include the bounding box of the current blob tracker from the current frame and the bounding box of the current blob tracker from the previous frame. In one illustrative example, for a later frame t (e.g., a current frame), the intersection of the two bounding boxes is denoted as $I_t$ and the union is denoted as $U_t$. Using such notation, the overlapping ratio for the two bounding boxes is defined as $$\alpha_t = \frac{I_t}{U_t}$$

and therefore is the overlapping ratio for the current blob tracker for frame t.

Figure 12:
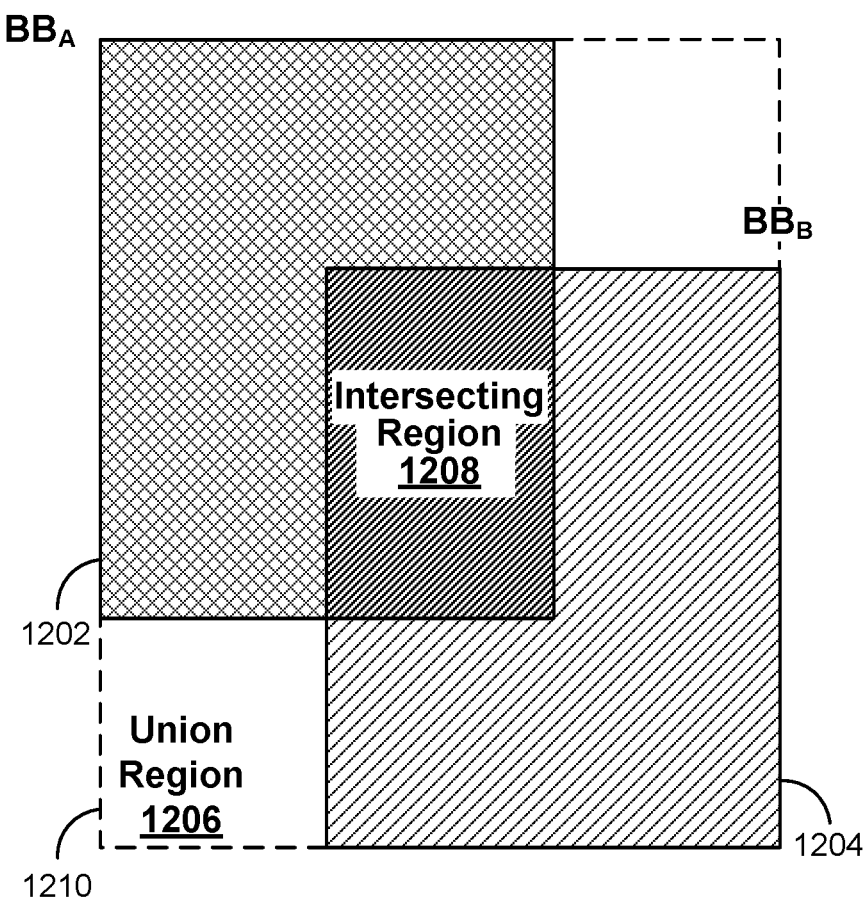
FIG. 12 is a diagram illustrating an example of an intersection and union of two bounding boxes, in accordance with some embodiments.

FIG. 12 shows an example of an intersection I and union U of two bounding boxes, including bounding box $BB_A$ 1202 of the blob tracker in the current frame and bounding box $BB_B$ 1204 of the blob tracker in the previous frame. The intersecting region 1208 includes the overlapped region between the bounding box $BB_A$ 1202 and the bounding box $BB_B$ 1204.

The union region 1206 includes the union of bounding box $BB_A$ 1202 and bounding box $BB_B$ 1204. The union of bounding box $BB_A$ 1202 and bounding box $BB_B$ 1204 is defined to use the far corners of the two bounding boxes to create a new bounding box 1210 (shown as dotted line). More specifically, by representing each bounding box with (x, y, w, h), where (x, y) is the upper-left coordinate of a bounding box, w and h are the width and height of the bounding box, respectively, the union of the bounding boxes would be represented as follows:

$$\text{Union}(BB_1, BB_2) = (\min(x_1, x_2), \min(y_1, y_2), (\max(x_1 + w_1 - 1, x_2 + w_2 - 1) - \min(x_1, x_2)), (\max(y_1 + h_1 - 1, y_2 + h_2 - 1) - \min(y_1, y_2)))$$

The overlapping ratio $a_t$ of the current blob tracker can be compared to the alignment threshold $F_{Align}$ to determine if the blob tracker is still in the current frame. For example, if the overlapping ratio $a_t$ is larger than (or equal to) the alignment threshold $F_{Align}$ (denoted as $a_t > F_{Align}$), the blob tracker is considered to be still in the current frame t (compared to the previous frame). In some examples, if the ratio $a_t$ is smaller than the alignment threshold $F_{Align}$ (denoted as $a_t \geq F_{Align}$), the blob tracker is considered to be not still in the current frame t (compared to the previous frame).

In some examples, the number of frames the current blob tracker is considered as being still can be determined. In such examples, the total number of still frames within a duration is firstly used as a condition to determine if a tracker is freeze tracker. The number of frames the current blob tracker is considered as being still can be denoted as $s_T = \sum_{t=1}^{T}(a_t > F_{Align}? 1:0)$, where the bounding boxes, blobs, and the containing frames are denoted with the relative timestamp of t, with t being from 1 through T, and where 1 is the time when the tracker was created and T (e.g., measured in frames) is the time when the tracker is being checked to be a frozen tracker. The term T can be either the threshold duration T1 or the threshold duration T2, since the state conversion transition process (e.g., state conversion transition process 916, 1000, or 1116) is invoked after the threshold duration T1 or T2 is met, as described above. The terminology "?1:0" indicates that a counter is incremented (with a value of 1) when the condition $a_t > F_{Align}$ is met, and that the counter is not incremented when the condition $a_t > F_{Align}$ is not met. In one illustrative example, if T is equal to 10 frames (indicating that it has been ten frames since the blob tracker was created), and the condition $a_t > F_{Align}$ is met for eight out of the ten frames, the $s_T$ counter will have a value of eight.

The number of frames $s_T$ the current blob tracker is considered as being still can then be compared to a threshold number of frames to determine if the current blob tracker is a frozen tracker or if the tracker is a good candidate to be detected as a frozen tracker. In one illustrative example, the number of frames $s_T$ is compared with the total number of frames T since the tracker was created. For example, a threshold To can be set as a percentage of the total number of frames since the tracker is created (and can be denoted as a threshold number of frames To). A multiplier m can be set to a relatively large number close to 1 (e.g., 0.7, 0.75, 0.8, 0.85, 0.9, or other suitable value), such that the threshold To requires a blob tracker to be still in most of the frames since it was created to be considered as a frozen tracker. The threshold To can be denoted as To=m*T. If the number of frames $s_T$ is larger than the threshold To (denoted as $s_T > m*T$), the current tracker is considered as a frozen tracker or as a good candidate to be detected as a frozen tracker. In one illustrative example, if m is set to 0.85, to be considered as a frozen tracker, the number of frames ($s_T$) the blob tracker must be detected as being still is 85% of the total number of frames (T) since the blob tracker was created. One of ordinary skill in the art will appreciate that the greater than (">") symbol can be replaced with a greater than or equal to ("≥") symbol without departing from the scope of this description.

In some examples, when a blob tracker does not meet the condition $s_T>m*T$, the blob tracker is not a good candidate for freeze tracker, and the whole frozen tracker detection process (e.g., step 1004 in FIG. 10) can terminate for the blob tracker and can identify the blob tracker as not being a frozen tracker. In some examples, when a blob tracker meets the condition $s_T>m*T$, the blob tracker can be detected as a frozen tracker and considered as a false positive tracker. The false positive frozen tracker can then be removed, as previously described.

In some examples, when a blob tracker meets the condition $s_T>m*T$, the blob tracker can be considered as a good candidate for a frozen tracker. In such cases, even a blob tracker that is a good candidate for a frozen tracker can be associated with a blob for a real object. For example, the blob tracker (and its associated blob and object) may just move slowly, but consistently, in one direction. Such movement of a blob tracker may lead to the condition $s_T>m*T$ being satisfied by the history of the blob tracker. Therefore, in order to prevent a blob tracker with such type of movement from being detected as a frozen tracker, in addition to the stillness inspection between always two consecutive frame pairs, the global stillness can be checked to determine whether the current tracker is still. More specifically, several pairs of bounding boxes can be sampled from the beginning and end of the bounding box history for the blob tracker. For example, the sample pairs of bounding boxes can be associated with timestamp pairs of (1+i, T−i), wherein i is equal to 1 through n, and wherein n can be a number (e.g., 4, 5, 6, 7, or any other suitable number). In one illustrative example, if T is equal to 30, and i is equal to 0 through 4 (with n=5), the sampled pairs of bounding boxes for the blob tracker include the bounding box pairs (1, 29), (2, 28), (3, 27), (4, 26), and (5, 25), with the notation (a, b) referring to (frame a, frame b) of the given duration T. Therefore, n pairs of bounding boxes can be chosen.

An overlapping ratio $a_i'$ is calculated similarly as $a_i$, but $a_i'$ is based on the intersection and union of blobs in frame 1+i and frame T−i instead of consecutive frames. The overlapping ratio $a_i'$ can be compared to a threshold $F_r$ to determine global movement of the blob tracker. The threshold $F_r$ can be a fixed value (e.g., 0.75, 0.80, 0.85, or other suitable value). In one illustrative example, if $a_i'$ is smaller than a threshold $F_r$ (denoted as $a_i'<F_r$), the blob tracker is considered to be moving and thus not a frozen tracker. In such an example, the whole frozen tracker detection process (e.g., step 1004 in FIG. 10) can terminate for the blob tracker and can identify the blob tracker as not being a frozen tracker. One of ordinary skill in the art will appreciate that the less than ("<") symbol can be replaced with a less than or equal to ("≤") symbol without departing from the scope of this description.

In some examples, when for any pair among the n pairs of tracker bounding boxes, $a_i'$ is always larger than $F_r$ (indicating the global movement is small due to much overlap), the blob tracker that was considered as a good candidate for a frozen tracker is finally identified as a frozen tracker. Once the blob tracker is detected as a frozen tracker, the tracking engine 106 can consider the blob tracker as a false positive tracker. The false positive frozen tracker can then be removed, as previously described.

The object tracking engine 106 can perform jumping tracker detection (e.g., step 1006 in FIG. 10) to check if an object (and its corresponding tracker) has certain size changes or has very irregular motion according to the bounding box history. For example, jumping trackers may correspond objects from irrelevant neighboring blobs or from noisy background objects even when the blobs for the objects are consistently associated with a tracker. It can be assumed for the jumping tracker detection that a blob tracker has a duration T (which can be measured in frames or units of time) since the tracker was created. In some examples, the duration T can be the threshold duration T1 or the threshold duration T2, since the state conversion transition process (e.g., state conversion transition process 916, 1000, or 1116) is invoked after the threshold duration T1 or T2 is met, as described above.

The object tracking engine 106 can identify a blob tracker as a jumping tracker based on irregular size changes of the blob tracker over the duration T. The size of a blob tracker within each frame t can be set to the size of the bounding box of the blob associated with the blob tracker in the frame. The size can be denoted as At. In one example, the size of a blob tracker can be determined by calculating the area of a bounding box associated with the blob tracker. The size ratio of a blob tracker across two consecutive frames is denoted as SRt, and is calculated as the bigger size bounding box divided by the smaller size bounding box, ensuring the size ratio is always set to be larger than or equal to 1.

An irregular size change can be determined when a change in size of the blob tracker between a previous video frame and the current video frame (as indicated by the size ratio SRt) is greater than a size change threshold. A number of irregular size changes that the blob tracker has experienced over its duration T can be determined, and the number of irregular size changes can be compared to a threshold number of irregular size changes. The blob tracker can be considered as a jumping tracker when the number of irregular size changes of the blob tracker is greater than the threshold number of irregular size changes.

In some aspects, different types of irregular size changes can be detected, and different threshold numbers can apply to the different types of irregular size changes. In some examples, the different types of irregular size changes can include dramatic size changes and significant size changes. A dramatic size change of a blob tracker's bounding boxes from one frame to another includes a size ratio greater than a dramatic size change threshold (denoted as $SR_t>R_d$). The term $R_d$ is the dramatic size change threshold of the size ratio and can be set to any suitable value (e.g., 2, 2.5, 3, 3.5, 4, 4.5, 5, or any other suitable value). In one illustrative example, if a bounding box of a blob tracker in a previous frame is 16×8 (e.g., 128 pixels) and a bounding box of the blob tracker in a current frame is 48×8 (e.g., 384 pixels), the size ratio SRt for the bounding box for the current frame is 3 (calculated as 384 divided by 128). In the same example, if the dramatic size change threshold $R_d$ is set to 2, the change in size of the blob tracker is considered a dramatic size change since the size ratio SRt of 3 is greater than the dramatic size change threshold of 2.

A significant size change of a blob tracker's bounding boxes from one frame to another includes a size ratio greater than a significant size change threshold (denoted as $SR_t>R_s$). The term $R_s$ is the significant size change threshold of the size ratio and can be set to any suitable value less than the dramatic size change threshold $R_d$ (e.g., 0.5, 1, 1.5, 2, or any other suitable value). In some cases, the significant size change threshold $R_s$ can be set to value that is close to, but less than, the dramatic size change threshold $R_d$. In one illustrative example, the dramatic size change threshold $R_d$ can be set to 2, and the significant size change threshold $R_s$ can be set to 1.5.

A number of dramatic size changes for a current blob tracker within the duration T can be calculated as $DC_T=\Sigma_{t=1}^{T}(SR_t>R_d?\ 1{:}0)$. Similarly, the number of significant size changes for a current blob tracker within the duration T can be calculated as $SC_T=\Sigma_{t=1}^{T}(SR_t>R_s?\ 1{:}0)$. If the number of dramatic size changes $DC_T$ is larger than a first threshold number C0, or the number of significant size changes $SC_T$ is larger than a second threshold number C1, the current blob tracker may be considered as a jumping tracker. The threshold numbers C0 and C1 can be set to any suitable number indicating a consistent pattern of size changes. In one illustrative example, C0 can be set to 3 and C1 can be set to 6. In some examples, a mixture of dramatic size changes and significant size changes may be detected and used to detect a blob tracker as a jumping tracker. For example, if any combination of dramatic size changes and significant size changes for a current blob tracker exceeds a third threshold number C2, the current blob tracker can be considered as a jumping tracker. The third threshold number C2 can be set to any suitable value, and can be the same as or different than the first and second threshold numbers C0 and C1. In one illustrative example, C0 can be set to 3 and C1 and C2 can be set to 6. In another illustrative example, C0 can be set to 3, C1 can be set to 6, and C3 can be set to 5. Once the blob tracker is detected as a jumping tracker, the tracking engine 106 can consider the blob tracker as a false positive tracker. The false positive frozen tracker can then be removed, as previously described. One of ordinary skill in the art will appreciate that the less than ("<") and greater than (">") symbols used in the irregular size change equations above can be replaced with less than or equal to ("≤") and greater than or equal to ("≥") symbols, respectively, without departing from the scope of this description.

In some examples, the threshold numbers C0 and/or C1 can be adjusted or set as different values for a new tracker than the values used for a split-new tracker. For example, smaller values can be used for split-new trackers because the threshold duration T2 for split-new trackers may be shorter than the threshold duration T1 for new trackers.

The object tracking engine 106 can also identify a blob tracker as a jumping tracker based on irregular motion changes of the blob tracker over the duration T. According to the history of the bounding boxes for a blob tracker, the motion (also referred to as the velocity) of the blob tracker for each frame t is calculated based on the centers of two bounding boxes of the blob tracker in two consecutive frames. Such velocity or motion can be denoted as Vt, which is a two dimensional vector. For example, as previously described, the velocity of a blob tracker can include the displacement of the blob tracker between consecutive frames. The displacement can be determined between the centers (or centroids) of two bounding boxes for the blob tracker in two consecutive frames. For instance, the velocity of a blob tracker can be defined as $V_t=C_t-C_{t-1}$, where $C_t-C_{t-1}=(C_{tx}-C_{t-1x}, C_{ty}-C_{t-1y})$. The term $C_t(C_{tx}, C_{ty})$ denotes the two-dimensional center of a bounding box of the tracker in a current frame, with $C_{tx}$ being the horizontal value, and $C_{ty}$ being the vertical value. The term $C_{t-1}(C_{t-1x}, C_{t-1y})$ denotes the two dimensional (horizontal and vertical) center of a bounding box of the tracker in a previous frame. In some cases, because the timing for video frame data is constant (according to the frame rate, such as 30 frames per second, 60 frames per second, 120 frames per second, or other suitable frame rate), a time variable may not be needed in the velocity calculation, in which case the velocity can also be considered as the motion of the blob tracker. In some cases, a time constant can be used (according to the frame rate).

In some examples, the irregular motion change of a blob tracker can include a detected motion direction consistency of the blob tracker. The motion direction consistency is based on velocities of the blob tracker between consecutive frames. For example, given two consecutive velocities $V_t$ and $V_{t-1}$ (both of which are two dimensional vectors) for two consecutive frames, the inner product of the $V_t$ and $V_{t-1}$ vectors is calculated. In some examples, the inner product can be normalized according to the length values of both vectors. The inner product equals to the cosine of the angle between the $V_t$ and $V_{t-1}$ vectors, denoted as $Cos_t$. The inner product provides the change in direction of the vectors $V_t$ and $V_{t-1}$. For example, the inner product is equal to a value of 1 (after normalization) when the two vectors $V_t$ and $V_{t-1}$ are in the same direction. As another example, the inner product is equal to a value of −1 (after normalization) when the two vectors $V_t$ and $V_{t-1}$ are in opposite directions.

In some examples, the inner products between the $V_t$ and $V_{t-1}$ vectors of the blob tracker between multiple pairs of consecutive frames are calculated and are accumulated. For example, the inner product ($Cos_t$) results that corresponds to detectable velocities (the non-zero velocities) are accumulated together to describe the motion direction consistency of the tracker. In order to avoid the cases when one or the vectors becomes too close to zero magnitude, the motion direction consistency of the blob tracker can be denoted as $MIC=\Sigma_{t=2}^{T}(Sig_t?\ Cos_t{:}\ 0)/\Sigma_{t=2}^{T}(Sig_t?\ 1{:}0)$, wherein the function $Sig_t$ checks whether the length of $V_t$ and $V_{t-1}$ are both larger than a certain value (e.g., 1 or other suitable value), mainly to exclude the cases when there is no motion in a certain frame for the tracker. Only if both vectors are significant, the inner product is taking into consideration for average. For example, $Sig_t$ is used to avoid the case where there is no movement, in which case $V_t$ or $V_{t-1}$ is 0 when there is no movement, and with a 0 velocity the inner product cannot be normalized because the $Cos_t$ will return an invalid value (e.g., infinity). The accumulation of the inner products is from t=2 to the duration T, with t=2 being the second frame after the blob tracker was first created at t=1.

The motion direction consistency of the blob tracker can then be compared to a motion direction threshold. For example, if direction consistency (calculated as MIC) is smaller than a motion direction threshold M the motion direction consistency is determined to be too inconsistent, and the tracker is considered as a jumping tracker. The value of MIC is in the range of −1 to 1. The motion direction threshold M can be set to any suitable value (e.g., −0.75, −0.5, −0.25, 0, 0.25, or other suitable value). In one illustrative example, if M is set to −0.5 (which corresponds to an angle of 120° between the vectors $V_t$ and $V_{t-1}$), then the motion direction consistency of a tracker must be between 1 and −0.5, meaning a change of direction between 0° and 120°. If a blob tracker is detected as a jumping tracker based on inconsistent motion direction, the tracking engine 106 can consider the blob tracker as a false positive tracker. The false positive frozen tracker can then be removed, as previously described.

In some examples, the irregular motion change of a blob tracker can include a detected motion magnitude consistency of the blob tracker. The motion magnitude includes the magnitudes of the velocities of the blob tracker for each frame over the duration T. For example, the magnitudes of velocities $V_t$ for the blob tracker over the duration is summed up as $SV=\Sigma_{t=1}^{T}|V_t|$. The summed velocity magnitudes SV is compared to a global motion magnitude. The global motion magnitude is a velocity vector that is calculated as the motion between the centers of the last bounding box (for frame t=T) and the first bounding box (for frame t=1) of the blob tracker, giving a global motion from the beginning of the tracker bounding box history to the end of the tracker bounding box history. The magnitude of the global motion is denoted as GV. The global motion GV is thus the motion between the first bounding box and the last bounding box, and the summed velocity magnitude SV is the accumulation of motion between bounding boxes of consecutive frames from t=1 to T. In some cases, the global motion magnitude GV is L-2 norm based (magnitude=$\sqrt{x^2+y^2}$).

The motion magnitude of the blob tracker can then be compared to a motion magnitude threshold. For example, the summed velocity magnitudes SV can be compared to the global motion magnitude GV multiplied by a velocity threshold (denoted as VelThres). The velocity threshold VelThres may be set to any suitable value (e.g., 2, 3, 4, 5, or other suitable value). If the summed velocity magnitudes SV is less than the global motion magnitude GV multiplied by a velocity threshold (denoted as SV<VelThres*GV), the motion magnitude of the blob tracker is considered as consistent and the current tracker is not considered as a jumping tracker due to this check. For example, if the accumulated velocity of a blob tracker is less than the global velocity of the blob tracker multiplied by the velocity threshold, then the step by step motion (per frame) of the blob tracker is not large enough to be considered as a jumping tracker. Otherwise, the current tracker is considered as a jumping tracker. For example, if the summed velocity magnitudes SV is greater than the global motion magnitude GV multiplied by the velocity threshold (denoted as SV>VelThres*GV), the current blob tracker is considered as a jumping tracker. If a blob tracker is detected as a jumping tracker based on inconsistent motion magnitude, the tracking engine 106 can consider the blob tracker as a false positive tracker. The false positive frozen tracker can then be removed, as previously described. One of ordinary skill in the art will appreciate that the less than ("<") and greater than (">") symbols used in the irregular motion change equations above can be replaced with less than or equal to ("≤") and greater than or equal to ("≥") symbols, respectively, without departing from the scope of this description.

In some examples, the x- and y-dimension of $V_t$ as well as that of the global motion can be used to quantify the motion consistency of a blob tracker. For example, instead of using magnitude of the vector for local motion, the absolute value of the x-dimension and the absolute value of the y-dimension of $V_t$ can be determined and added up. The summed value can be used instead of the magnitude. In one illustrative example, a vector with magnitude 5 can have a x-dimension value of 3 and a y-dimension value of 4, and the summed x- and y-dimension values are 7. The 7 value can be used instead of the 5 value in the motion consistency calculation. Similarly, the absolute value of the x-dimension and the absolute value of the y-dimension of the global motion can be used to in the motion magnitude consistency calculation. In such examples, the summed x- and y-dimensions of the velocity vectors of the blob tracker over the duration can be compared to the global motion x- and y-dimensions to determine the consistency of the motion magnitude for the blob tracker.

In some examples, the motion magnitude can be compared to the size of the current bounding box. For example, the size of the bounding box is its width and height (e.g., sum of width and height, product of the width and height, or the like), and the motion of the bounding box is determined from its center point. Here, the magnitude can be normalized according to the size of the bounding box. The velocity threshold VelThres used for motion magnitude consistency can thus be adjusted according to the size of the bounding box currently being analyzed. For example, for bigger bounding boxes, the velocity threshold VelThres may be lowered.

In some situations, it may be suitable to implement a less aggressive jumping tracker detection technique. For example, there are cases when the motion of an object in a scene is at least partially perpendicular to the image plane (e.g., an object moving towards the camera or moving away from the camera). In such cases, even when the motion is relatively significant, the SV or other summed up local motion according to center position movement of an object will be relatively small, leading to a tracker associated with a real object being detected as a jumping tracker and the object being considered as a false positive object. In such situations, the relevant thresholds can be adaptively adjusted to make them larger (thus less aggressive) based the content in a scene.

To implement less aggressive jumping tracker detection, a half-way global motion (denoted as $V_h$) of a blob tracker can be calculated. The half-way global motion $V_h$ is derived from the center positions of two bounding boxes of the blob tracker at two relative timestamps 1 and T/2, with T/2 being the frame halfway between the original frame for which the blob tracker was created and the duration T. The magnitude of $V_h$ is then derived and scaled by a value (e.g., a value of 2, 3, or other suitable value). The magnitude of $V_h$ is denoted as GVH, with GVH=$|V_h|$). The ratio between GVH and GV is calculated as r=min (GVH, GV)/max (GVH, GV). The velocity threshold VelThres can then be set to be a function of r. The GVH and GV are compared to one another because ideally the GVH and GV values should be proportional over the duration T of a blob tracker, assuming uniform motion. If GVH and GV are consistent, then the velocity threshold VelThres can be left unchanged. However, if GVH and GV are inconsistent (as indicated by the ratio r), then the velocity threshold VelThres can be adjusted according to the ratio r.

In some cases, there can be situations when none of the above jumping tracker checks (e.g., size change, motion direction consistency, and motion magnitude consistency) individually leads to a blob tracker being detected as a jumping tracker. In some examples, the factors of the above checks can be jointly considered to determine whether a blob tracker is a jumping tracker. For example, if the comparisons of the various characteristics are close to the conditions for each jumping tracker check (within a certain percentage, such as 5%, 10%, 15%, or any other suitable value), the blob tracker can be considered as a jumping tracker.

Using the above-described techniques, tracking of false positive objects can be avoided by identifying certain blob trackers that are associated with the false positive objects, and preventing the trackers from being converted to a normal status and output to the system (e.g., for display as a tracked object). For example, false positive objects/blobs can be detected during blob detection. However, as long as the false positive objects/blobs are not output to the system level, and no events are formulated according to those false positive blobs, the system will remain stable and will not track false positive objects. The systems and methods described herein can get rid of the system level false positive events, which is critical to the overall performance of the tracking system in video analytics.

The systems and methods described herein can be evaluated in an end-to-end IP camera (IPC) system, where the blob/object detection rate and the blob/object tracking rate, as well as the false positive rate, are important numbers compared with ground truth. In one example, 35 video clips were tested with or without the proposed techniques turned on (proposed) and off (anchor). As shown in Table 1, the detection accuracy rate and tracking accuracy rate are kept at the same level, even with the removal of certain trackers. However, the number of false positive objects identified have dropped on average from about 7 to 1, which is a significant improvement. The table also reflects the false positive rate differences, where the average value of 27% in the anchor method has been dropped to 9%, which is a change of ⅓. A 27% false positive rate (achieved using the anchor method) is unacceptable for practical applications.

TABLE 1

| Method | Det. Accuracy (avg.) | Trac. Accuracy (avg.) | True positive Rate (avg.) | False positive Rate (avg.) | #false positive objects (avg.) |
|---|---|---|---|---|---|
| Anchor | 0.44 | 0.64 | 0.91 | 0.27 | 6.63 |
| Proposed | 0.41 | 0.65 | 0.89 | 0.09 | 1.00 |

FIG. 13 illustrates an example of a process 1300 of maintaining a plurality of blob trackers for one or more video frames using the techniques described herein. At 1302, the process 1300 includes associating a blob tracker with a blob generated for a video frame. The blob includes pixels of at least a portion of one or more foreground objects in the video frame. For example, the blob tracker can be matched with the blob using the data association engine 414 (e.g., based on a cost or distance between the blob tracker and the blob).

At 1304, the process 1300 includes determining whether the blob tracker is a first type of tracker or a second type of tracker. The first type of tracker has a first bounding box and a second bounding box with an overlapping ratio greater than an alignment threshold for the first type of tracker. In some examples, the first type of tracker can be referred to as a frozen tracker. The second type of tracker has an irregular size change or an irregular motion change over a threshold duration. In some examples, the second type of tracker can be referred to as a jumping tracker.

In some examples, determining whether the blob tracker is the first type of tracker includes determining an alignment threshold for the blob tracker, and determining the overlapping ratio of the first bounding box and the second bounding box of the blob tracker. In some aspects, the overlapping ratio includes a ratio of an intersection and a union of the first bounding box of the blob tracker in a previous video frame and the second bounding box of the blob tracker in the video frame. The video frame can include the current video frame that is current being analyzed by the process 1300. In some implementations, the alignment threshold for the blob tracker is based on a size of the first bounding box or the second bounding box of the blob tracker. For example, the alignment threshold can be adaptive to the size of a current bounding box of the blob tracker in the video frame. As previously described, the alignment threshold (denoted above as $F_{Align}$) indicates how much of overlap in terms of percentage (e.g., normalized to 0 and 1) the history of bounding boxes of the blob tracker aligns. In some examples, determining whether the blob tracker is the first type of tracker further includes comparing the overlapping ratio of the blob tracker to the alignment threshold, and determining the blob tracker is the first type of tracker when the overlapping ratio is greater than the alignment threshold.

In some aspects, the total number of frames the blob tracker is detected as being still or frozen (based on the overlapping ratio-alignment threshold comparison) within a duration can be used as a condition to determine if the blob tracker is the first type of tracker. For example, the blob tracker is determined to be the first type of tracker when overlapping ratios of the blob tracker are greater than the alignment threshold for a threshold number of frames. In one illustrative example, the threshold number of frames (denoted as T0 above) can be set as a percentage of the total number of frames since the blob tracker was created.

In some examples, determining whether the blob tracker is the second type of tracker includes determining a number of irregular size changes of the blob tracker within the threshold duration. An irregular size change includes a change in size of the blob tracker between a previous video frame and the video frame greater than a size change threshold. Determining whether the blob tracker is the second type of tracker further includes comparing the number of irregular size changes of the blob tracker to a threshold number of irregular size changes, and determining the blob tracker is the second type of tracker when the number of irregular size changes of the blob tracker is greater than the threshold number of irregular size changes.

As described above, different types of irregular size changes can be detected, including dramatic size changes and significant size changes. For example, a dramatic size change of a blob tracker's bounding boxes from one frame to another can include a size ratio greater than a dramatic size change threshold. In another example, a significant size change of a blob tracker's bounding boxes from one frame to another can include a size ratio greater than a significant size change threshold, where the significant size change threshold is less than the dramatic size change threshold (indicating that dramatic size changes include larger size changes than significant size changes). Different threshold numbers can be used for dramatic size changes and significant size changes (denoted as C0 and C1 above). For example, if the number of dramatic size changes is larger than a first threshold number, the current blob tracker may be considered as the second type of tracker. In another example, if the number of significant size changes is larger than a second threshold number, the current blob tracker may be considered as the second type of tracker. The second threshold number can be a higher number than the first threshold number, indicating that more significant size changes are required than dramatic size changes in order to qualify the blob tracker as the second type of tracker.

In some aspects, determining whether the blob tracker is the second type of tracker includes determining an irregular motion change of the blob tracker. In such aspects, the irregular motion change includes a motion direction consistency of the blob tracker, and the motion direction consistency is based on velocities of the blob tracker between consecutive frames. For example, given two consecutive velocities $V_t$ and $V_{t-1}$ (both of which are two dimensional vectors) for two consecutive frames t and t−1, the inner product of the $V_t$ and $V_{t-1}$ vectors can be calculated. As described above, according to the history of the bounding boxes for the blob tracker, the velocity (which can also be referred to as motion) of the blob tracker for each frame can be calculated based on the centers of two bounding boxes of the blob tracker in the two consecutive frames t and t−1. The inner products between the $V_t$ and $V_{t-1}$ vectors of the blob tracker between multiple pairs of consecutive frames can then be calculated and accumulated to determine the motion direction consistency. In some examples, a function (e.g., a function $\text{Sig}_t$) can be used to check whether the length of $V_t$ and $V_{t-1}$ are both larger than a certain value (e.g., 1 or other suitable value), for example, to exclude cases when there is no motion in a certain frame for the blob tracker. Determining whether the blob tracker is the second type of tracker further includes comparing the motion direction consistency of the blob tracker to a motion direction threshold, and determining the blob tracker is the second type of tracker when the motion direction consistency of the blob tracker is less than the motion direction threshold.

In some aspects, determining whether the blob tracker is the second type of tracker includes determining an irregular motion change of the blob tracker. In such aspects, the irregular motion change includes a motion magnitude of the blob tracker, and the motion magnitude includes a magnitude of velocities of the blob tracker over the threshold duration. For example, the motion magnitude can be determined by summing magnitudes of velocities for the blob tracker between multiple pairs of consecutive frames over the threshold duration (denoted as duration T above). Determining whether the blob tracker is the second type of tracker further includes comparing the motion magnitude of the blob tracker to a motion magnitude threshold. In some examples, the motion magnitude threshold can include a global motion magnitude (denoted as GV above) multiplied by a velocity threshold (denoted as VelThres above). Determining whether the blob tracker is the second type of tracker further includes determining the blob tracker is the second type of tracker when the motion magnitude of the blob tracker is greater than the motion magnitude threshold.

In some aspects, the process 1300 includes associating an additional blob tracker with an additional blob generated for the video frame. The additional blob tracker is split from the blob tracker in the frame. The additional blob tracker can also be referred to as a split-new blob tracker, as previously described. In such aspects, the process 1300 further includes transitioning the additional blob tracker to a new blob tracker in response to removal of the blob tracker from the plurality of blob trackers. The new blob tracker has a longer threshold duration for being output as an identified blob tracker-blob pair with the additional blob than the additional blob tracker. For example, as described above, new blob trackers have a longer threshold duration for being an converted to normal trackers than split-new trackers. As noted above, normal trackers and associated blobs are output as identified blob tracker-blob pairs.

In some aspects, the process 1300 includes determining a duration the blob tracker has been associated with one or more blobs, and determining the duration is greater than the threshold duration. In such aspects, the blob tracker is determined to be the first type of tracker or the second type of tracker in response to the duration being greater than the threshold duration. Using such aspects, the determination of whether the blob tracker is of the first type (e.g., frozen) or of the second type (e.g., jumping) is invoked when the threshold duration is exceeded.

At 1306, the process 1300 includes removing the blob tracker from the plurality of blob trackers maintained for the one or more video frames when the blob tracker is the first type of tracker or the second type of tracker. For example, the blob tracker can be transitioned to a dead state when it is determined to be of the first type (e.g., frozen) or of the second type (e.g., jumping). The blob tracker is thus determined to be associated with a false positive object, in which case the process 1300 prevents the blob tracker from being converted to a normal status and output to the system.

In some examples, the process 1300 may be performed by a computing device or an apparatus, such as the video analytics system 100. For example, the process 1300 can be performed by the video analytics system 100 and/or the object tracking engine 106 shown in FIG. 1. In some cases, the computing device or apparatus may include a processor, microprocessor, microcomputer, or other component of a device that is configured to carry out the steps of process 1300. In some examples, the computing device or apparatus may include a camera configured to capture video data (e.g., a video sequence) including video frames. For example, the computing device may include a camera device (e.g., an IP camera or other type of camera device) that may include a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

Process 1300 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1300 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The blob tracking operations discussed herein may be implemented using compressed video or using uncompressed video frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of maintaining a plurality of blob trackers for one or more video frames, the method comprising:
    associating a blob tracker with a blob generated for a video frame, wherein the blob includes pixels of at least a portion of one or more foreground objects in the video frame;
    determining a number of irregular size changes of the blob tracker over a threshold duration, wherein an irregular size change includes a change in size of the blob tracker between a previous video frame and the video frame greater than a size change threshold;
    determining the blob tracker is a second type of tracker based on the irregular size change or an irregular motion change over the threshold duration; and
    removing the blob tracker from the plurality of blob trackers maintained for the one or more video frames when the blob tracker is the second type of tracker.

2. The method of claim 1, further comprising:
    determining the blob tracker is a first type of tracker, wherein the first type of tracker has a first bounding box and a second bounding box with an overlapping ratio greater than an alignment threshold, wherein the overlapping ratio includes a ratio of an intersection and a union of the first bounding box of the blob tracker in the previous video frame and the second bounding box of the blob tracker in the video frame; and
    removing the blob tracker from the plurality of blob trackers maintained for the one or more video frames when the blob tracker is the first type of tracker.

3. The method of claim 2, wherein determining whether the blob tracker is the first type of tracker comprises:
    determining an alignment threshold for the blob tracker;
    determining the overlapping ratio of the first bounding box and the second bounding box of the blob tracker;
    comparing the overlapping ratio of the blob tracker to the alignment threshold; and
    determining the blob tracker is the first type of tracker when the overlapping ratio is greater than the alignment threshold.

4. The method of claim 3, wherein the alignment threshold for the blob tracker is based on a size of the first bounding box or the second bounding box of the blob tracker.

5. The method of claim 3, wherein the blob tracker is determined to be the first type of tracker when overlapping ratios of the blob tracker are greater than the alignment threshold for a threshold number of frames.

6. The method of claim 2, further comprising:
    determining a duration the blob tracker has been associated with one or more blobs; and determining the duration is greater than the threshold duration, wherein the blob tracker is determined to be the first type of tracker or the second type of tracker in response to the duration being greater than the threshold duration.

7. The method of claim 1, wherein determining the blob tracker is the second type of tracker comprises:
comparing the number of irregular size changes of the blob tracker to a threshold number of irregular size changes; and
determining the blob tracker is the second type of tracker when the number of irregular size changes of the blob tracker is greater than the threshold number of irregular size changes.

8. The method of claim 1, wherein determining the blob tracker is the second type of tracker comprises:
determining an irregular motion change of the blob tracker, the irregular motion change including a motion direction consistency of the blob tracker, wherein the motion direction consistency is based on velocities of the blob tracker between consecutive frames;
comparing the motion direction consistency of the blob tracker to a motion direction threshold; and
determining the blob tracker is the second type of tracker when the motion direction consistency of the blob tracker is less than the motion direction threshold.

9. The method of claim 1, wherein determining the blob tracker is the second type of tracker further comprises:
determining an irregular motion change of the blob tracker, the irregular motion change including a motion magnitude of the blob tracker, wherein the motion magnitude includes a magnitude of velocities of the blob tracker over the threshold duration;
comparing the motion magnitude of the blob tracker to a motion magnitude threshold; and
determining the blob tracker is the second type of tracker when the motion magnitude of the blob tracker is greater than the motion magnitude threshold.

10. The method of claim 1, further comprising:
associating an additional blob tracker with an additional blob generated for the video frame, wherein the additional blob tracker is split from the blob tracker for the video frame; and
transitioning the additional blob tracker to a new blob tracker in response to removal of the blob tracker from the plurality of blob trackers, wherein the new blob tracker has a longer threshold duration for being output as an identified blob tracker-blob pair with the additional blob than the additional blob tracker.

11. An apparatus for maintaining a plurality of blob trackers for one or more video frames, comprising:
a memory configured to store video data; and
a processor configured to:
associate a blob tracker with a blob generated for a video frame, wherein the blob includes pixels of at least a portion of one or more foreground objects in the video frame;
determine a number of irregular size changes of the blob tracker over a threshold duration, wherein an irregular size change includes a change in size of the blob tracker between a previous video frame and the video frame greater than a size change threshold;
determine the blob tracker is a second type of tracker based on the irregular size change or an irregular motion change over the threshold duration; and
remove the blob tracker from a plurality of blob trackers maintained for the one or more video frames when the blob tracker is the second type of tracker.

12. The apparatus of claim 11, wherein the processor is further configured to:
determine the blob tracker is a first type of tracker, wherein the first type of tracker has a first bounding box and a second bounding box with an overlapping ratio greater than an alignment threshold, wherein the overlapping ratio includes a ratio of an intersection and a union of the first bounding box of the blob tracker in the previous video frame and the second bounding box of the blob tracker in the video frame; and
remove the blob tracker from the plurality of blob trackers maintained for the one or more video frames when the blob tracker is the first type of tracker.

13. The apparatus of claim 12, wherein determining the blob tracker is the first type of tracker comprises:
determining an alignment threshold for the blob tracker;
determining the overlapping ratio of the first bounding box and the second bounding box of the blob tracker;
comparing the overlapping ratio of the blob tracker to the alignment threshold; and
determining the blob tracker is the first type of tracker when the overlapping ratio is greater than the alignment threshold.

14. The apparatus of claim 13, wherein the alignment threshold for the blob tracker is based on a size of the first bounding box or the second bounding box of the blob tracker.

15. The apparatus of claim 13, wherein the blob tracker is determined to be the first type of tracker when overlapping ratios of the blob tracker are greater than the alignment threshold for a threshold number of frames.

16. The apparatus of claim 12, wherein the processor is further configured to:
determine a duration the blob tracker has been associated with one or more blobs; and
determine the duration is greater than the threshold duration, wherein the blob tracker is determined to be the first type of tracker or the second type of tracker in response to the duration being greater than the threshold duration.

17. The apparatus of claim 11, wherein determining the blob tracker is the second type of tracker comprises:
comparing the number of irregular size changes of the blob tracker to a threshold number of irregular size changes; and
determining the blob tracker is the second type of tracker when the number of irregular size changes of the blob tracker is greater than the threshold number of irregular size changes.

18. The apparatus of claim 11, wherein determining the blob tracker is the second type of tracker comprises:
determining an irregular motion change of the blob tracker, the irregular motion change including a motion direction consistency of the blob tracker, wherein the motion direction consistency is based on velocities of the blob tracker between consecutive frames;
comparing the motion direction consistency of the blob tracker to a motion direction threshold; and
determining the blob tracker is the second type of tracker when the motion direction consistency of the blob tracker is less than the motion direction threshold.

19. The apparatus of claim 11, wherein determining whether the blob tracker is the second type of tracker comprises:

determining an irregular motion change of the blob tracker, the irregular motion change including a motion magnitude of the blob tracker, wherein the motion magnitude includes a magnitude of velocities of the blob tracker over the threshold duration;

comparing the motion magnitude of the blob tracker to a motion magnitude threshold; and determining the blob tracker is the second type of tracker when the motion magnitude of the blob tracker is greater than the motion magnitude threshold.

20. The apparatus of claim 11, wherein the processor is further configured to:

associate an additional blob tracker with an additional blob generated for the video frame, wherein the additional blob tracker is split from the blob tracker; and transition the additional blob tracker to a new blob tracker in response to removal of the blob tracker from the plurality of blob trackers, wherein the new blob tracker has a longer threshold duration for being output as an identified blob tracker-blob pair with the additional blob than the additional blob tracker.

21. A non-transitory computer readable medium having stored thereon instructions that when executed by a processor perform a method, including:

associating a blob tracker with a blob generated for a video frame, wherein the blob includes pixels of at least a portion of one or more foreground objects in the video frame;

determining a number of irregular size changes of the blob tracker within the threshold duration, wherein an irregular size change includes a change in size of the blob tracker between a previous video frame and the video frame greater than a size change threshold;

determining the blob tracker is a second type of tracker based on the irregular size change or an irregular motion change over the threshold duration; and removing the blob tracker from a plurality of blob trackers maintained for one or more video frames when the blob tracker is the second type of tracker.

22. The non-transitory computer readable medium of claim 21, wherein the method further comprises:

determining the blob tracker is a first type of tracker, wherein the first type of tracker has a first bounding box and a second bounding box with an overlapping ratio greater than an alignment threshold, wherein the overlapping ratio includes a ratio of an intersection and a union of the first bounding box of the blob tracker in the previous video frame and the second bounding box of the blob tracker in the video frame; and removing the blob tracker from the plurality of blob trackers maintained for the one or more video frames when the blob tracker is the first type of tracker.

23. The non-transitory computer readable medium of claim 22, wherein determining the blob tracker is the first type of tracker comprises:

determining an alignment threshold for the blob tracker;

determining an overlapping ratio of the first bounding box and the second bounding box of the blob tracker;

comparing the overlapping ratio of the blob tracker to the alignment threshold; and determining the blob tracker is the first type of tracker when the overlapping ratio is greater than the alignment threshold.

24. The non-transitory computer readable medium of claim 23, wherein the alignment threshold for the blob tracker is based on a size of the first bounding box or the second bounding box of the blob tracker.

25. The non-transitory computer readable medium of claim 23, wherein the blob tracker is determined to be the first type of tracker when overlapping ratios of the blob tracker are greater than the alignment threshold for a threshold number of frames.

26. The non-transitory computer readable medium of claim 22, further comprising:

determining a duration the blob tracker has been associated with one or more blobs; and determining the duration is greater than the threshold duration, wherein the blob tracker is determined to be the first type of tracker or the second type of tracker in response to the duration being greater than the threshold duration.

27. The non-transitory computer readable medium of claim 21, wherein determining the blob tracker is the second type of tracker comprises:

comparing the number of irregular size changes of the blob tracker to a threshold number of irregular size changes; and determining the blob tracker is the second type of tracker when the number of irregular size changes of the blob tracker is greater than the threshold number of irregular size changes.

28. The non-transitory computer readable medium of claim 21, wherein determining the blob tracker is the second type of tracker further comprises:

determining an irregular motion change of the blob tracker, the irregular motion change including a motion direction consistency of the blob tracker, wherein the motion direction consistency is based on velocities of the blob tracker between consecutive frames;

comparing the motion direction consistency of the blob tracker to a motion direction threshold; and determining the blob tracker is the second type of tracker when the motion direction consistency of the blob tracker is less than the motion direction threshold.

29. The non-transitory computer readable medium of claim 21, wherein determining the blob tracker is the second type of tracker comprises:

determining an irregular motion change of the blob tracker, the irregular motion change including a motion magnitude of the blob tracker, wherein the motion magnitude includes a magnitude of velocities of the blob tracker over the threshold duration;

comparing the motion magnitude of the blob tracker to a motion magnitude threshold; and determining the blob tracker is the second type of tracker when the motion magnitude of the blob tracker is greater than the motion magnitude threshold.

30. The non-transitory computer readable medium of claim 21, further comprising:

associating an additional blob tracker with an additional blob generated for the video frame, wherein the additional blob tracker is split from the blob tracker; and transitioning the additional blob tracker to a new blob tracker in response to removal of the blob tracker from the plurality of blob trackers, wherein the new blob tracker has a longer threshold duration for being output as an identified blob tracker-blob pair with the additional blob than the additional blob tracker.

* * * * *